United States Patent
Gross

(10) Patent No.: US 11,104,602 B2
(45) Date of Patent: *Aug. 31, 2021

(54) GLASS WITH HIGH SURFACE STRENGTH

(71) Applicant: CORNING INCORPORATED, Corning, NY (US)

(72) Inventor: Timothy Michael Gross, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/191,961

(22) Filed: Jun. 24, 2016

(65) Prior Publication Data

US 2016/0376187 A1  Dec. 29, 2016

Related U.S. Application Data

(60) Provisional application No. 62/266,417, filed on Dec. 11, 2015, provisional application No. 62/184,933, filed on Jun. 26, 2015.

(51) Int. Cl.
*C03C 3/097* (2006.01)
*H05K 5/00* (2006.01)
(Continued)

(52) U.S. Cl.
CPC .............. *C03C 3/097* (2013.01); *B32B 7/12* (2013.01); *B32B 9/045* (2013.01); *B32B 17/06* (2013.01);
(Continued)

(58) Field of Classification Search
None
See application file for complete search history.

(56) References Cited

U.S. PATENT DOCUMENTS 3,433,611 A   3/1969  Saunders
3,485,647 A * 12/1969 Harrington ............. C03C 3/083
                                                         501/63
(Continued)

FOREIGN PATENT DOCUMENTS

CA   2391745 C   8/2012
EP   2594536 A1  5/2013
(Continued)

OTHER PUBLICATIONS

U.S. Appl. No. 62/343,320, DeMartino et al. (Year: 2016).*
(Continued)

*Primary Examiner* — David Sample
(74) *Attorney, Agent, or Firm* — Payal Patel; Leffrey A. Schmidt

(57) ABSTRACT

Embodiments of alkali aluminosilicate glass articles that may be chemically strengthened to achieve a maximum surface compressive stress that exceeds compressive stresses that have been achieved in similar glasses are disclosed. In one or more embodiments, the fictive temperature of these glass articles may be equal to the $10^{11}$ poise (P) viscosity temperature of the glass article. In some embodiments, the strengthened alkali aluminosilicate glass articles described herein may exhibit a maximum compressive stress of at least about 400 MPa, 800 MPa, 930 MPa or 1050 MPa. In some embodiments, the strengthened alkali aluminosilicate glass articles described herein may exhibit a compressive stress layer extending to a depth of layer of at least about 40 µm (in samples having a thickness of 1 mm). In still other embodiments, these strengthened alkali aluminosilicate glass articles exhibit a parabolic or near-parabolic tensile stress profile in the central region of the glass articles.

32 Claims, 3 Drawing Sheets

(51) Int. Cl.
*H05K 5/03* (2006.01)
*C03C 4/18* (2006.01)
*B32B 17/06* (2006.01)
*C03C 21/00* (2006.01)
*B32B 9/04* (2006.01)
*B32B 7/12* (2006.01)
*B32B 27/36* (2006.01)

(52) U.S. Cl.
CPC .......... *B32B 27/365* (2013.01); *C03C 21/002* (2013.01); *B32B 2264/10* (2013.01); *B32B 2307/412* (2013.01); *B32B 2307/414* (2013.01); *B32B 2307/418* (2013.01); *B32B 2307/54* (2013.01); *B32B 2307/732* (2013.01); *B32B 2457/00* (2013.01); *B32B 2457/20* (2013.01)

(56) References Cited

U.S. PATENT DOCUMENTS

| | | | |
|---|---|---|---|
| 3,495,963 A | 2/1970 | Buckley | |
| 3,357,876 A | 12/1976 | Welling | |
| 4,055,703 A | 10/1977 | Rinehart | |
| 4,726,981 A * | 2/1988 | Pierson | C03C 10/0027 428/212 |
| 6,518,211 B1 * | 2/2003 | Bradshaw | C03C 3/085 428/410 |
| 8,759,238 B2 | 6/2014 | Chapman et al. | |
| 8,765,262 B2 | 7/2014 | Gross | |
| 9,701,569 B2 * | 7/2017 | DeMartino | C03C 3/085 |
| 10,579,106 B2 * | 3/2020 | DeMartino | C03C 3/085 |
| 2010/0035745 A1 * | 2/2010 | Murata | C03C 3/083 501/66 |
| 2010/0215993 A1 * | 8/2010 | Yagi | C03C 3/097 428/846.9 |
| 2011/0014475 A1 | 1/2011 | Murata | |
| 2011/0294648 A1 * | 12/2011 | Chapman | C03C 3/097 501/63 |
| 2011/0294649 A1 * | 12/2011 | Gomez | C03C 21/001 501/66 |
| 2012/0135226 A1 | 5/2012 | Bookbinder et al. | |
| 2013/0004758 A1 | 1/2013 | Dejneka et al. | |
| 2013/0017380 A1 | 1/2013 | Murata et al. | |
| 2013/0045375 A1 * | 2/2013 | Gross | C03C 3/091 428/220 |
| 2013/0115422 A1 | 5/2013 | Murata | |
| 2013/0122284 A1 | 5/2013 | Gross | |
| 2013/0288001 A1 | 10/2013 | Murata et al. | |
| 2014/0023865 A1 * | 1/2014 | Comte | C03C 3/083 428/410 |
| 2014/0170380 A1 | 6/2014 | Murata et al. | |
| 2014/0308526 A1 * | 10/2014 | Chapman | C03C 21/002 428/410 |
| 2014/0370302 A1 | 12/2014 | Amin et al. | |
| 2015/0004390 A1 | 1/2015 | Kawamoto et al. | |
| 2015/0037586 A1 | 2/2015 | Gross | |
| 2015/0064472 A1 | 3/2015 | Gross et al. | |
| 2015/0064474 A1 | 3/2015 | Dejneka et al. | |
| 2015/0074974 A1 | 3/2015 | Pesansky et al. | |
| 2015/0093581 A1 | 4/2015 | Murata et al. | |
| 2015/0111030 A1 | 4/2015 | Miyasaka et al. | |
| 2015/0140325 A1 | 5/2015 | Gross et al. | |
| 2015/0147576 A1 | 5/2015 | Bookbinder et al. | |
| 2015/0329413 A1 | 11/2015 | Beall et al. | |
| 2015/0368147 A1 | 12/2015 | Dejneka et al. | |
| 2015/0368149 A1 | 12/2015 | Guo et al. | |
| 2016/0236970 A1 | 8/2016 | Beall et al. | |
| 2017/0022092 A1 | 1/2017 | Demartino et al. | |

FOREIGN PATENT DOCUMENTS

| | | | |
|---|---|---|---|
| GB | 1320466 | 6/1973 | |
| JP | 2000007372 A | 1/2000 | |
| JP | 2008-115072 A | 5/2008 | |
| JP | WO 2012099053 A1 * | 7/2012 | ............. C03C 3/085 |
| JP | WO 2013027675 A1 * | 2/2013 | ............. C03C 3/087 |
| JP | 2013-533838 A | 8/2013 | |
| JP | 2013-544227 A | 12/2013 | |
| TW | 201210973 A | 3/2012 | |
| TW | 201307235 A | 2/2013 | |
| TW | 201431818 A | 8/2014 | |
| WO | 2012126394 | 9/2012 | |
| WO | 2013/006301 A1 | 1/2013 | |
| WO | 2014/014798 A1 | 1/2014 | |
| WO | 2014/120641 A2 | 8/2014 | |
| WO | WO 2014120628 A2 * | 8/2014 | ............. C03C 3/091 |
| WO | 2015/031427 A2 | 3/2015 | |
| WO | 2015/175595 A1 | 11/2015 | |

OTHER PUBLICATIONS

Kidari A., et al., "Novel Na—Li—SiAlPON glasses prepared by melt synthesis using AlN," J.Europ.Ceram.Soc., 2012, vol. 32, No. 7, p. 1389.

Japanese Patent Application No. 2017566688 Notice of Allowance Downloaded From Global Dossier; Draft Date Feb. 22, 2019; 3 Pages; Japanese Patent Office.

International Search Report and Written Opinion PCT/US2016/039207 dated Sep. 16, 2016.

European Patent Application No. 16736677.2 Communication under Rule 71(3) EPC dated Jan. 18, 2019; 6 Pages; European Patent Office.

European Patent Application No. 16736677.2 Decision to grant a European patent pursuant to Article 97(1) EPC dated Mar. 7, 2019; 2 Pages; European Patent Office.

European Patent Application No. 19156734.6 European Search Report and Search Opinion dated May 17, 2019; 9 Pages; European Patent Office.

International Preliminary Report on Patentability of the International Searching Authority; PCT/US2016/039207; dated Jan. 4, 2018; 12 Pages; European Patent Office.

* cited by examiner

GLASS WITH HIGH SURFACE STRENGTH

CROSS-REFERENCE TO RELATED APPLICATIONS

This application claims the benefit of priority under 35 U.S.C. § 119 of U.S. Provisional Application Ser. No. 62/266,417 filed on Dec. 11, 2015 and U.S. Provisional Application Ser. No. 62/184,933 filed on Jun. 26, 2015, the content of which is relied upon and incorporated herein by reference in its entirety.

BACKGROUND

The disclosure relates to a chemically strengthened glass article. More particularly, the disclosure relates to chemically strengthened glass articles comprising a surface layer having a high compressive stress.

Glass articles are widely used in electronic devices as cover plates or windows for portable or mobile electronic communication and entertainment devices, such as cellular phones, smart phones, tablets, video players, information terminal (IT) devices, laptop computers and the like, as well as in other applications. As glass articles become more widely used, it has become more important to develop strengthened glass articles having improved survivability, especially when subjected to tensile stresses and/or relatively deep flaws caused by contact with hard and/or sharp surfaces.

SUMMARY

The present disclosure provides alkali aluminosilicate glass articles that may be chemically strengthened by an ion exchange process to impart a compressive stress on surface portions thereof that exhibit a maximum surface compressive stress that exceeds the compressive stresses that have been achieved in similar glasses. For example, in one or more embodiments, the glasses described herein may be ion exchanged to achieve a surface compressive stress of at least about 400 MPa, at least about 800 MPa, at least about 930 MPa, or at least about 1050 MPa. In one or more embodiments, the compressive stress layer extends from a surface to various depths of layer (DOL). For example, DOL may be about 25 µm or less. In other embodiments, the alkali aluminosilicate glass articles may be ion exchanged to achieve a deeper or thicker compressive layer (e.g., at least about 40 µm). These DOL values may be exhibited in glass articles having a thickness of about 1 mm. In still other embodiments, these glasses may be ion exchanged such that the resulting glass article includes a central region extending from the DOL to a depth into the glass article that includes a tensile stress having a parabolic or near-parabolic profile. In one or more embodiments, the alkali aluminosilicate glass may exhibit a tensile region extending from the DOL into the glass article. The tensile region of one or more embodiments may exhibit a maximum tensile stress of less than about 20 MPa. The tensile region of one or more embodiments may exhibit a maximum tensile stress of greater than about 40 MPa (e.g., about 45 MPa or greater, about 50 MPa or greater, about 60 MPa or greater, about 70 MPa or greater, about 75 MPa or greater, about 80 MPa or greater, or about 85 MPa or greater).

In one or more embodiments, the alkali aluminosilicate glass articles may comprise a fictive temperature is equal to the $10^{11}$ poise (P) viscosity temperature of the glass article. In one or more embodiments, the alkali aluminosilicate glass article comprises a zircon breakdown temperature of less than about 35 kPoise. In one or more embodiments, the alkali aluminosilicate glass article comprises a liquidus viscosity of at least about 200 kPoise.

A second aspect of this disclosure pertains to an alkali aluminosilicate glass article comprising a certain composition. In one or more embodiments, such articles can be chemically strengthened to achieve the attributes described herein. In one or more embodiments, the alkali aluminosilicate glass article comprises at least about 58 mol % $SiO_2$, from about 0.5 mol % to about 3 mol % $P_2O_5$, at least about 11 mol % $Al_2O_3$, $Na_2O$ and $Li_2O$. In one or more embodiments, the alkali aluminosilicate glass article comprises from about 58 mol % to about 65 mol % $SiO_2$; from about 11 mol % to about 19 mol % $Al_2O_3$; from about 6 mol % to about 18 mol % $Na_2O$; from 0 mol % to about 6 mol % MgO; and from 0 mol % to about 6 mol % ZnO.

In one or more embodiments, the alkali aluminosilicate glass exhibits a compositional ratio of the amount of $Li_2O$ (mol %) to the amount of $Na_2O$ (mol %) (i.e., $Li_2O/Na_2O$) that is less than 1.0. In one or more embodiments, the alkali aluminosilicate glass article is free of $B_2O_3$. In one or more embodiments, the alkali aluminosilicate glass article comprises a ratio $R_2O$(mol %)/$Al_2O_3$(mol %) that is less than 2, where $R_2O=Li_2O+Na_2O$. In one or more embodiments, the alkali aluminosilicate glass article comprises a total amount of $SiO_2$ and $P_2O_5$ that is greater than 65 mol % and less than 67 mol % (65 mol % <$SiO_2$(mol %)+$P_2O_5$(mol %)<67 mol %). In some instances, the alkali aluminosilicate glass article comprises a relationship $R_2O$(mol %)+R'O(mol %) ($Al_2O_3$(mol %)+$P_2O_5$(mol %)) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article. In some instances, the alkali aluminosilicate glass article comprises $P_2O_5$ in an amount in a range from about 0.5 mol % to about 2.8 mol %. In some other instances, the alkali aluminosilicate glass article comprises $Li_2O$ in an amount up to about 10 mol % $Li_2O$.

In one or more embodiments, the alkali aluminosilicate glass articles may have a thickness in a range from about 0.05 mm to about 1.5 mm. For example, the thickness may be from about 0.1 mm to about 1.5, from about 0.3 mm to about 1.2 mm, from about 0.4 mm to about 1.2 mm or from about 0.5 mm to about 1.2 mm. In one or more embodiments, the alkali aluminosilicate glass articles may have a thickness of at least about 1 mm and may exhibit a maximum compressive stress of at least about 930 MPa at the surface. In one or more embodiments, the alkali aluminosilicate glass articles may have a thickness of at least about 1 mm and may exhibit a maximum compressive stress of at least about 1050 MPa at the surface. In one or more embodiments, the alkali aluminosilicate glass article may exhibit a bend radius of less than about 37 mm or less than about 35 mm, at a thickness of about 1 mm.

In one or more embodiments, the alkali aluminosilicate glass articles described herein may include a central region extending from the DOL to a depth equal to 0.5 times the thickness, and this central region may be free of $K_2O$.

A third aspect of the disclosure relates to an alkali aluminosilicate glass article having a thickness t, a compressive stress layer extending from a surface of the alkali aluminosilicate glass to a DOL, and a central region extending from the DOL, wherein the central region is under a tensile stress, wherein DOL≤0.25 t, and wherein the tensile stress is at least about 35 MPa. The alkali aluminosilicate glass article is free of $B_2O_3$ and, in some embodiments, $K_2O$, and comprises at least 0.5 mol % $P_2O_5$, $Na_2O$ and, $Li_2O$, wherein $Li_2O$ (mol %)/$Na_2O$ (mol %)<1. In some embodiments, alkali aluminosilicate glass article includes at least about 58 mol % $SiO_2$, from about 0.5 mol % to about 3 mol % $P_2O_5$, at least about 11 mol % $Al_2O_3$, $Na_2O$ and, $Li_2O$, wherein the ratio of the amount of $Li_2O$ (mol %) to $Na_2O$ (mol %) ($Li_2O/Na_2O$) is less than 1.0

A fourth aspect of the disclosure pertains to a transparent laminate. The transparent laminate comprises an alkali aluminosilicate glass article as described herein joined to a second article. The second article may comprise a transparent substrate. A fifth aspect of this disclosure pertains to a consumer electronic device including one or more embodiments of the alkali aluminosilicate glass articles described herein, which may be chemically strengthened as described herein. In one or more embodiments, the consumer electronic device comprises: a housing; electrical components provided at least partially internal to the housing, the electrical components including at least a controller, a memory, and a display, the display being provided at or adjacent to a front surface of the housing; and a cover article disposed at or over the front surface of the housing and over the display, wherein the cover article comprises one or more embodiments of the alkali aluminosilicate glass article described herein.

A sixth aspect of the disclosure pertains to a method of making a strengthened alkali aluminosilicate glass article that comprises a compressive stress layer. In one or more embodiments, the method comprises generating a compressive stress in an alkali aluminosilicate glass article by ion exchanging the aluminosilicate glass article. In one or more embodiments, the compressive stress layer extends from a surface of the alkali aluminosilicate glass article to a DOL. The compressive stress layer may comprise a maximum compressive stress of about 400 MPa or greater, about 800 MPa or greater or about 1050 MPa or greater. In one or more embodiments, the DOL may be at least about 40 μm. In one or more embodiments, ion exchanging the alkali aluminosilicate glass comprises immersing the alkali aluminosilicate glass in a molten salt bath. The molten salt bath can comprise $NaNO_3$, $KNO_3$ or both $NaNO_3$ and $KNO_3$. In one or more embodiments, the method may include joining the ion exchanged alkali aluminosilicate glass to a substrate to form a laminate structure. In one or more embodiments, the method may include joining the ion exchanged alkali aluminosilicate glass to an electronic device housing.

These and other aspects, advantages, and salient features will become apparent from the following detailed description, the accompanying drawings, and the appended claims.

DETAILED DESCRIPTION

Figure 1:
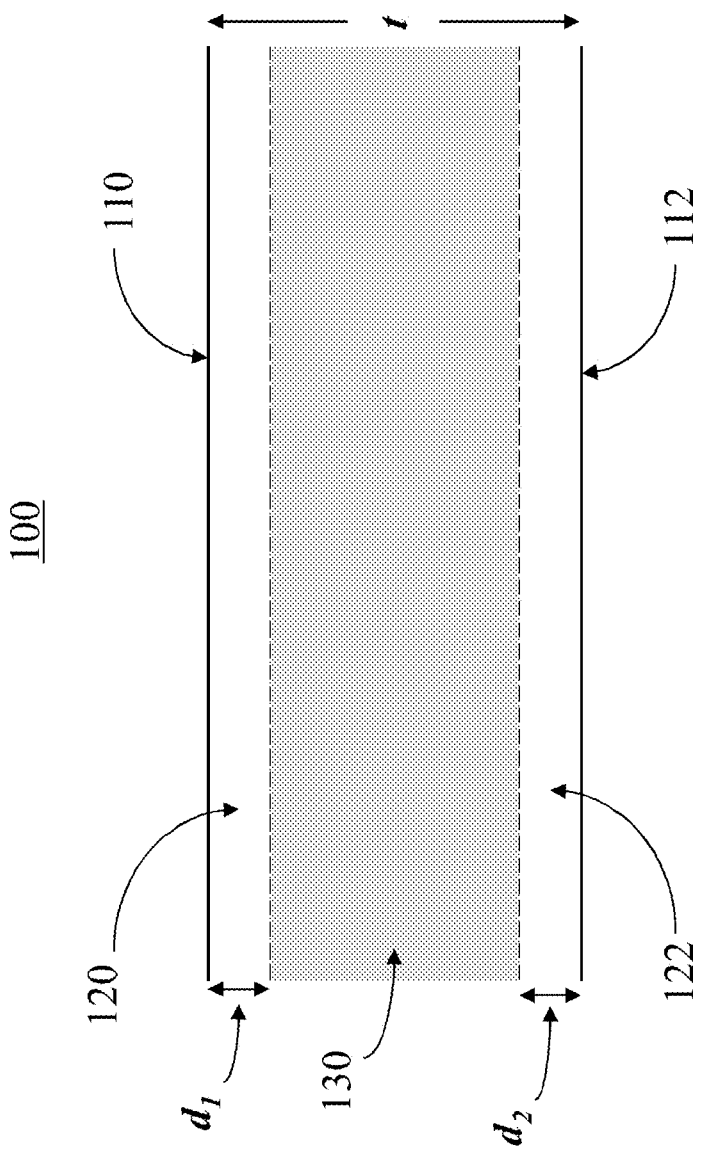
FIG. 1 is a schematic cross-sectional view of a strengthened alkali aluminosilicate glass article according to one or more embodiments.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass article" is used in its broadest sense to include any object made wholly or partly of glass. Unless otherwise specified, all compositions of the glasses described herein are expressed in terms of mole percent (mol %), and the constituents are provided on an oxide basis. The compositions of all molten salt baths—as well as any other ion exchange media—that are used for ion exchange are expressed in weight percent (wt %). Coefficients of thermal expansion (CTE) are expressed in terms of parts per million (ppm)/° C. and represent a value measured over a temperature range from about 20° C. to about 300° C., unless otherwise specified. High temperature (or liquid) coefficients of thermal expansion (high temperature CTE) are also expressed in terms of part per million (ppm) per degree Celsius (ppm/° C.), and represent a value measured in the high temperature plateau region of the instantaneous coefficient of thermal expansion (CTE) vs. temperature curve. The high temperature CTE measures the volume change associated with heating or cooling of the glass through the transformation region.

Unless otherwise specified, all temperatures are expressed in terms of degrees Celsius (° C.). As used herein the term "softening point" refers to the temperature at which the viscosity of a glass is approximately $10^{7.6}$ poise (P), the term "anneal point" refers to the temperature at which the viscosity of a glass is approximately $10^{13.2}$ poise, the term "200 poise temperature ($T^{200P}$)" refers to the temperature at which the viscosity of a glass is approximately 200 poise, the term "$10^{11}$ poise temperature" refers to the temperature at which the viscosity of a glass is approximately $10^{11}$ poise, the term "35 kP temperature ($T^{35kP}$)" refers to the temperature at which the viscosity of a glass is approximately 35 kilopoise (kP), and the term "160 kP temperature ($T^{160kP}$)" refers to the temperature at which the viscosity of a glass is approximately 160 kP.

As used herein, the term "zircon breakdown temperature" or "$T^{breakdown}$" refers to the temperature at which zircon—which is commonly used as a refractory material in glass processing and manufacture—breaks down to form zirconia and silica, and the term "zircon breakdown viscosity" refers to the viscosity of the glass at $T^{breakdown}$. The term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. The term "35 kP temperature" or "$T^{35kP}$" refers to the temperature at which the glass or glass melt has a viscosity of 35,000 Poise (P), or 35 kiloPoise (kP).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of $K_2O$" is one in which $K_2O$ is not actively added or batched into the glass, but may be present in very small amounts as a contaminant.

As used herein, "maximum compressive stress" refers to the highest compressive stress value measured within the compressive stress layer. In some embodiments, the maximum compressive stress is located at the surface of the glass. In other embodiments, the maximum compressive stress may occur at a depth below the surface, giving the compressive profile the appearance of a "buried peak." Compressive stress is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to a modified version of Procedure C described in ASTM standard C770-98 (2013), entitled "Standard Test Method for Measurement of Glass Stress-Optical Coefficient," the contents of which are incorporated herein by reference in their entirety. The modification includes using a glass disc as the specimen with a thickness of 5 to 10 mm and a diameter of 12.7 mm, wherein the disc is isotropic and homogeneous and core drilled with both faces polished and parallel. The modification also includes calculating the maximum force, Fmax to be applied. The force should be sufficient to produce at least 20 MPa compression stress. Fmax is calculated as follows:

$$Fmax=7.854*D*h$$

Where:
Fmax=Force in Newtons
D=the diameter of the disc
h=the thickness of the light path
For each force applied, the stress is computed as follows:

$$\sigma_{MPa}=8F/(\pi*D*h)$$

Where:
F=Force in Newtons
D=the diameter of the disc
h=the thickness of the light path As used herein, DOL means the depth at which the stress in the chemically strengthened alkali aluminosilicate glass article described herein changes from compressive to tensile. DOL may be measured by FSM or SCALP depending on the ion exchange treatment. Where the stress in the glass article is generated by exchanging potassium ions into the glass article, FSM is used to measure DOL. Where the stress is generated by exchanging sodium ions into the glass article, SCALP is used to measure DOL. Where the stress in the glass article is generated by exchanging both potassium and sodium ions into the glass, the DOL is measured by SCALP, since it is believed the exchange depth of sodium indicates the DOL and the exchange depth of potassium ions indicates a change in the magnitude of the compressive stress (but not the change in stress from compressive to tensile); the exchange depth of potassium ions in such glass articles is measured by FSM.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are alkali aluminosilicate glasses that may be chemically strengthened by an ion exchange process to impart a surface compressive stress that exceeds compressive stresses that have been achieved in similar glasses. For example, when 1 mm thick coupons of the glasses described herein are ion exchanged in a molten potassium nitrate ion exchange bath at 410° C. for 45 minutes, a maximum surface compressive stress exceeding about 1050 MPa, or, in some embodiments, exceeding about 1075 MPa, or, in still other embodiments, at least 1100 MPa is obtained. The fictive temperature equal of these glasses is equal to the $10^{11}$ P temperature of the glass.

In one or more embodiments, the alkali aluminosilicate glass articles have a homogenous in microstructure (i.e., the glass is not phase separated). In one or more embodiments, the alkali aluminosilicate glass article is amorphous. As used herein, "amorphous" when used to describe glass article means substantially free of crystallites or crystalline phases (i.e., containing less than 1 vol % crystallites or crystalline phases).

The alkali aluminosilicate glass articles described herein are formed from glass compositions that are fusion formable. In one or more embodiments, the glass composition may have a liquidus viscosity greater than about 200 kilopoise (kP) and, in some embodiments, having a liquidus viscosity of at least about 600 kP. In some embodiments, these glass articles and compositions are compatible with a zircon isopipe: the viscosity at which the glass breaks down the zircon isopipe to create zirconia defects is less than 35 kP. Selected glass compositions within the composition ranges described herein may have a zircon breakdown viscosity that is greater than 35 kP. In such instances, an alumina isopipe may be used to fusion form these glass articles.

In one or more embodiments, the alkali aluminosilicate glass articles may include a glass composition that comprises at least 0.5 mol % $P_2O_5$, $Na_2O$ and, optionally, $Li_2O$, where $Li_2O$ (mol %)/$Na_2O$ (mol %)<1. In addition, these glasses are free of $B_2O_3$ and $K_2O$. The alkali aluminosilicate glasses described herein may further include ZnO, MgO, and $SnO_2$.

In some embodiments, the alkali aluminosilicate glass article comprises or consists essentially of at least about 58 mol % $SiO_2$, from about 0.5 mol % to about 3 mol % $P_2O_5$, at least about 11 mol % $Al_2O_3$, $Na_2O$ and $Li_2O$.

In one or more embodiments, the alkali aluminosilicate glass article comprises or consists essentially of from about 58 mol % to about 65 mol % $SiO_2$; from about 11 mol % to about 20 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the glass comprises or consists essentially of from about 63 mol % to about 65 mol % $SiO_2$; from 11 mol % to about 19 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In one or more embodiments, the alkali aluminosilicate glass article comprises the ratio $R_2O$ (mol %)/$Al_2O_3$ (mol %) that is less than about 2 (e.g., less than about 1.8, less than about 1.6, less than about 1.5, or less than about 1.4), where $R_2O=Li_2O+Na_2O$.

In one or more embodiments, the alkali aluminosilicate glass article comprises the relationship where the total amount of $SiO_2$ and $P_2O_5$ that is greater than 65 mol % and less than 67 mol % (i.e., 65 mol %<$SiO_2$ (mol %)+$P_2O_5$ (mol %))<67 mol %). For example, the total amount of $SiO_2$ and $P_2O_5$ may be in a range from about 65.1 mol % to about 67 mol %, from about 65.2 mol % to about 67 mol %, from about 65.3 mol % to about 67 mol %, from about 65.4 mol % to about 67 mol %, from about 65.5 mol % to about 67 mol %, from about 65.6 mol % to about 67 mol %, from about 65.7 mol % to about 67 mol %, from about 65.8 mol % to about 67 mol %, from about 65.9 mol % to about 67 mol %, from about 66 mol % to about 67 mol %, from about 65 mol % to about 66.9 mol %, from about 65 mol % to about 66.8 mol %, from about 65 mol % to about 66.7 mol %, from about 65 mol % to about 66.6 mol %, from about 65 mol % to about 66.5 mol %, from about 65 mol % to about 66.4 mol %, from about 65 mol % to about 66.3 mol %, from about 65 mol % to about 66.2 mol %, from about 65 mol % to about 66.1 mol %, or from about 65 mol % to about 66 mol %.

In one or more embodiments, the alkali aluminosilicate glass article comprises a relationship $R_2O$ (mol %)+R'O (mol %)−($Al_2O_3$(mol %)+$P_2O_5$ (mol %)) (mol %) that is greater than about −3 mol % (i.e., $R_2O$ (mol %)+R'O (mol %)−($Al_2O_3$(mol %)+$P_2O_5$ (mol %))). In one or more embodiments, $R_2O$ is the total amount of $Li_2O$ and $Na_2O$ (i.e., $R_2O=Li_2O+Na_2O$). In one or more embodiments, R'O is the total amount of divalent metal oxides present in the alkali aluminosilicate glass. In one or more embodiments, the relationship $R_2O$ (mol %)+R'O (mol %)−($Al_2O_3$(mol %)+$P_2O_5$ (mol %)) that is greater than about −2.5 mol %, greater than about −2 mol %, greater than about −1.5 mol %, greater than about −1 mol %, greater than about −0.5 mol %, greater than about 0 mol %, greater than about 0.5 mol %, greater than about 1 mol %, greater than about 1.5 mol %, greater than about 2 mol %, greater than about 2.5 mol %, greater than about 3 mol %, greater than about 3.5 mol %, greater than about 4 mol %, greater than about 4.5 mol %, greater than about 5 mol %, greater than about 5.5 mol %, or greater than about 6 mol %, greater than about 6.5 mol %, greater than about 7 mol %, greater than about 7.5 mol %, greater than about 8 mol %, greater than about 8.5 mol %, greater than about 9 mol %, or greater than about 9.5 mol %.

Tables 1 lists exemplary compositions of the alkali aluminosilicate glasses described herein. Table 2 lists selected physical properties determined for the examples listed in Table 1. The physical properties listed in Table 2 include: density; low temperature and high temperature CTE; strain, anneal and softening points; $10^{11}$ Poise, 35 kP, 200 kP, liquidus, and zircon breakdown temperatures; zircon breakdown and liquidus viscosities; Poisson's ratio; Young's modulus; refractive index, and stress optical coefficient. In some embodiments, the glasses described herein have a high temperature CTE of less than or equal to 30 ppm/° C. and/or a Young's modulus of at least 70 GPa and, in some embodiments, a Young's modulus of up to 80 GPa.

TABLE 1

Examples of alkali aluminosilicate glass compositions.

| Composition (mol %) | Ex. 1 | Ex. 2 | Ex. 3 | Ex. 4 | Ex. 5 | Ex. 6 | Ex. 7 |
|---|---|---|---|---|---|---|---|
| $SiO_2$ | 63.77 | 64.03 | 63.67 | 63.91 | 64.16 | 63.21 | 63.50 |
| $Al_2O_3$ | 12.44 | 12.44 | 11.83 | 11.94 | 11.94 | 11.57 | 11.73 |
| $P_2O_5$ | 2.43 | 2.29 | 2.36 | 2.38 | 1.92 | 1.93 | 1.93 |
| $Li_2O$ | 0.00 | 0.00 | 0.00 | 0.00 | 0.00 | 0.00 | 0.00 |
| $Na_2O$ | 16.80 | 16.81 | 16.88 | 16.78 | 16.80 | 17.63 | 16.85 |
| ZnO | 0.00 | 4.37 | 0.00 | 4.93 | 0.00 | 5.59 | 5.93 |
| MgO | 4.52 | 0.02 | 5.21 | 0.02 | 5.13 | 0.02 | 0.01 |
| $SnO_2$ | 0.05 | 0.05 | 0.05 | 0.05 | 0.05 | 0.05 | 0.05 |
| $R_2O/Al_2O_3$ | 1.35 | 1.35 | 1.43 | 1.41 | 1.41 | 1.52 | 1.44 |
| $Li_2O/Na_2O$ | 0.00 | 0.00 | 0.00 | 0.00 | 0.00 | 0.00 | 0.00 |
| ($R_2O$ + RO) − $Al_2O_3$ − $P_2O_5$ | 6.45 | 6.46 | 7.89 | 7.40 | 8.07 | 9.74 | 9.14 |

| Composition (mol %) | Ex. 8 | Ex. 9 | Ex. 10 | Ex. 11 | Ex. 12 | Ex. 13 | Ex. 14 |
|---|---|---|---|---|---|---|---|
| $SiO_2$ | 63.37 | 63.43 | 63.56 | 63.58 | 63.66 | 63.62 | 63.67 |
| $Al_2O_3$ | 11.72 | 12.49 | 12.63 | 12.59 | 12.91 | 12.85 | 12.89 |
| $P_2O_5$ | 2.00 | 2.32 | 2.46 | 2.46 | 2.43 | 2.45 | 2.47 |
| $Li_2O$ | 0.00 | 0.00 | 1.42 | 2.87 | 0.00 | 1.42 | 2.92 |
| $Na_2O$ | 16.84 | 17.16 | 15.45 | 14.04 | 16.89 | 15.48 | 13.92 |
| ZnO | 6.00 | 4.54 | 4.43 | 4.41 | 4.04 | 4.12 | 4.06 |
| MgO | 0.02 | 0.02 | 0.02 | 0.02 | 0.02 | 0.02 | 0.02 |
| $SnO_2$ | 0.05 | 0.04 | 0.05 | 0.05 | 0.05 | 0.05 | 0.05 |
| $R_2O/Al_2O_3$ | 1.44 | 1.37 | 1.34 | 1.34 | 1.31 | 1.31 | 1.31 |
| $Li_2O/Na_2O$ | 0.00 | 0.00 | 0.09 | 0.20 | 0.00 | 0.09 | 0.21 |
| ($R_2O$ + RO) − $Al_2O_3$ − $P_2O_5$ | 9.14 | 6.90 | 6.22 | 6.29 | 5.62 | 5.72 | 5.57 |

| Composition (mol %) | Ex. 15 | Ex. 16 | Ex. 17 | Ex. 18 | Ex. 19 | Ex. 20 | Ex. 21 |
|---|---|---|---|---|---|---|---|
| $SiO_2$ | 63.55 | 63.80 | 63.76 | 63.88 | 63.74 | 64.03 | 63.68 |
| $Al_2O_3$ | 12.92 | 12.90 | 12.95 | 13.48 | 13.37 | 13.26 | 13.19 |
| $P_2O_5$ | 2.35 | 2.34 | 2.37 | 2.31 | 2.34 | 2.29 | 2.46 |
| $Li_2O$ | 0.00 | 1.47 | 2.94 | 0.00 | 1.48 | 2.94 | 0.00 |
| $Na_2O$ | 17.97 | 16.36 | 14.85 | 17.20 | 15.96 | 14.37 | 16.84 |
| ZnO | 0.00 | 0.00 | 0.00 | 0.00 | 0.00 | 0.00 | 3.77 |
| MgO | 3.17 | 3.08 | 3.09 | 3.08 | 3.08 | 3.06 | 0.02 |
| $SnO_2$ | 0.05 | 0.04 | 0.05 | 0.05 | 0.04 | 0.04 | 0.05 |
| $R_2O/Al_2O_3$ | 1.39 | 1.38 | 1.37 | 1.28 | 1.30 | 1.31 | 1.28 |
| $Li_2O/Na_2O$ | 0.00 | 0.09 | 0.20 | 0.00 | 0.09 | 0.20 | 0.00 |
| ($R_2O$ + RO) − $Al_2O_3$ − $P_2O_5$ | 5.87 | 5.67 | 5.56 | 4.48 | 4.81 | 4.83 | 4.98 |

| Composition (mol %) | Ex. 22 | Ex. 23 | Ex. 24 | Ex. 25 | Ex. 26 | Ex. 27 | Ex. 28 |
|---|---|---|---|---|---|---|---|
| $SiO_2$ | 63.66 | 63.76 | 63.67 | 63.73 | 63.73 | 63.64 | 63.76 |
| $Al_2O_3$ | 14.15 | 15.31 | 13.87 | 14.82 | 12.93 | 16.62 | 16.59 |
| $P_2O_5$ | 2.47 | 2.44 | 2.47 | 2.43 | 2.48 | 2.47 | 2.47 |
| $Li_2O$ | 1.49 | 2.98 | 1.50 | 2.96 | 0.00 | 2.52 | 4.91 |
| $Na_2O$ | 15.31 | 13.79 | 15.36 | 13.93 | 16.83 | 14.68 | 12.20 |
| ZnO | 2.85 | 1.64 | 0.00 | 0.00 | 2.98 | 0.00 | 0.00 |
| MgO | 0.03 | 0.03 | 3.09 | 2.08 | 1.00 | 0.03 | 0.03 |
| $SnO_2$ | 0.05 | 0.04 | 0.05 | 0.05 | 0.05 | 0.05 | 0.05 |
| $R_2O/Al_2O_3$ | 1.19 | 1.10 | 1.22 | 1.14 | 1.30 | 1.03 | 1.03 |
| $Li_2O/Na_2O$ | 0.10 | 0.22 | 0.10 | 0.21 | 0.00 | 0.17 | 0.40 |
| ($R_2O$ + RO) − $Al_2O_3$ − $P_2O_5$ | 3.05 | 0.70 | 3.61 | 1.72 | 5.40 | −1.86 | −1.92 |

| Composition (mol %) | Ex. 29 | Ex. 30 | Ex. 31 | Ex. 32 | Ex. 33 | Ex. 34 | Ex. 35 |
|---|---|---|---|---|---|---|---|
| $SiO_2$ | 63.89 | 63.92 | 63.77 | 63.73 | 63.70 | 63.65 | 63.87 |
| $Al_2O_3$ | 16.55 | 15.29 | 15.27 | 15.30 | 15.27 | 15.22 | 15.29 |
| $P_2O_5$ | 2.47 | 2.24 | 2.31 | 2.39 | 2.40 | 2.48 | 2.37 |
| $Li_2O$ | 7.27 | 3.46 | 2.98 | 4.02 | 4.46 | 4.96 | 5.39 |
| $Na_2O$ | 9.74 | 13.46 | 13.99 | 12.91 | 12.51 | 11.99 | 11.44 |
| ZnO | 0.00 | 1.56 | 1.61 | 1.57 | 1.58 | 1.63 | 1.57 |
| MgO | 0.03 | 0.02 | 0.02 | 0.03 | 0.03 | 0.02 | 0.02 |

TABLE 1-continued

Examples of alkali aluminosilicate glass compositions.

| | | | | | | | |
|---|---|---|---|---|---|---|---|
| SnO$_2$ | 0.04 | 0.04 | 0.04 | 0.05 | 0.04 | 0.05 | 0.04 |
| R$_2$O/Al$_2$O$_3$ | 1.03 | 1.11 | 1.11 | 1.11 | 1.11 | 1.11 | 1.10 |
| Li$_2$O/Na$_2$O | 0.75 | 0.26 | 0.21 | 0.31 | 0.36 | 0.41 | 0.47 |
| (R$_2$O + RO) − Al$_2$O$_3$ − P$_2$O$_5$ | −1.98 | 0.97 | 1.01 | 0.84 | 0.90 | 0.91 | 0.76 |

| Composition (mol %) | Ex. 36 | Ex. 37 | Ex. 38 | Ex. 39 | Ex. 40 | Ex. 41 | Ex. 42 |
|---|---|---|---|---|---|---|---|
| SiO$_2$ | 63.69 | 63.75 | 63.70 | 63.62 | 63.74 | 63.77 | 63.77 |
| Al$_2$O$_3$ | 15.26 | 15.30 | 15.27 | 15.23 | 15.27 | 15.27 | 15.33 |
| P$_2$O$_5$ | 2.45 | 2.42 | 2.45 | 2.46 | 2.47 | 2.46 | 2.44 |
| Li$_2$O | 2.96 | 2.98 | 3.94 | 3.98 | 4.93 | 4.93 | 2.91 |
| Na$_2$O | 13.50 | 13.46 | 12.54 | 12.57 | 11.49 | 11.50 | 13.94 |
| ZnO | 2.06 | 2.01 | 2.03 | 2.06 | 2.03 | 2.00 | 0.00 |
| MgO | 0.02 | 0.03 | 0.02 | 0.03 | 0.03 | 0.03 | 1.57 |
| SnO$_2$ | 0.05 | 0.04 | 0.04 | 0.05 | 0.04 | 0.05 | 0.04 |
| R$_2$O/Al$_2$O$_3$ | 1.08 | 1.08 | 1.08 | 1.09 | 1.08 | 1.08 | 1.10 |
| Li$_2$O/Na$_2$O | 0.22 | 0.22 | 0.31 | 0.32 | 0.43 | 0.43 | 0.21 |
| (R$_2$O + RO) − Al$_2$O$_3$ − P$_2$O$_5$ | 0.83 | 0.77 | 0.80 | 0.95 | 0.73 | 0.73 | 0.66 |

| Composition (mol %) | Ex. 43 | Ex. 44 | Ex. 45 | Ex. 46 | Ex. 47 | Ex. 48 | Ex. 49 |
|---|---|---|---|---|---|---|---|
| SiO$_2$ | 63.69 | 63.81 | 63.65 | 63.71 | 63.62 | 63.65 | 63.62 |
| Al$_2$O$_3$ | 15.25 | 15.26 | 15.33 | 15.32 | 15.24 | 15.68 | 15.67 |
| P$_2$O$_5$ | 2.43 | 2.41 | 2.46 | 2.44 | 2.47 | 2.44 | 2.48 |
| Li$_2$O | 4.00 | 4.89 | 2.96 | 4.01 | 4.91 | 6.07 | 6.06 |
| Na$_2$O | 13.01 | 12.03 | 13.29 | 12.25 | 11.42 | 10.93 | 10.53 |
| ZnO | 0.00 | 0.00 | 2.24 | 2.20 | 2.27 | 1.17 | 1.57 |
| MgO | 1.57 | 1.56 | 0.03 | 0.03 | 0.02 | 0.02 | 0.02 |
| SnO$_2$ | 0.05 | 0.04 | 0.05 | 0.04 | 0.05 | 0.04 | 0.05 |
| R$_2$O/Al$_2$O$_3$ | 1.12 | 1.11 | 1.06 | 1.06 | 1.07 | 1.08 | 1.06 |
| Li$_2$O/Na$_2$O | 0.31 | 0.41 | 0.22 | 0.33 | 0.43 | 0.56 | 0.58 |
| (R$_2$O + RO) − Al$_2$O$_3$ − P$_2$O$_5$ | 0.90 | 0.81 | 0.73 | 0.73 | 0.91 | 0.08 | 0.04 |

| Composition (mol %) | Ex. 50 | Ex. 51 | Ex. 52 | Ex. 53 | Ex. 54 | Ex. 55 | Ex. 56 |
|---|---|---|---|---|---|---|---|
| SiO$_2$ | 63.60 | 63.89 | 63.84 | 63.90 | 63.88 | 64.74 | 60.17 |
| Al$_2$O$_3$ | 15.65 | 16.09 | 16.47 | 16.87 | 16.97 | 15.25 | 18.58 |
| P$_2$O$_5$ | 2.46 | 2.42 | 2.43 | 2.43 | 2.42 | 0.98 | 1.90 |
| Li$_2$O | 6.13 | 6.80 | 7.84 | 8.75 | 9.78 | 5.28 | 5.16 |
| Na$_2$O | 10.29 | 9.97 | 8.96 | 7.99 | 6.88 | 12.09 | 12.58 |
| ZnO | 1.81 | 0.78 | 0.39 | 0.00 | 0.00 | 1.61 | 1.55 |
| MgO | 0.02 | 0.02 | 0.02 | 0.02 | 0.02 | 0.02 | 0.02 |
| SnO$_2$ | 0.04 | 0.04 | 0.04 | 0.04 | 0.04 | 0.03 | 0.03 |
| R$_2$O/Al$_2$O$_3$ | 1.05 | 1.04 | 1.02 | 0.99 | 0.98 | 1.14 | 0.96 |
| Li$_2$O/Na$_2$O | 0.60 | 0.68 | 0.87 | 1.10 | 1.42 | 0.44 | 0.41 |
| (R$_2$O + RO) − Al$_2$O$_3$ − P$_2$O$_5$ | 0.14 | −0.94 | −1.68 | −2.54 | −2.70 | 2.78 | −1.16 |

| Composition (mol %) | Ex. 57 | Ex. 58 | Ex. 59 | Ex. 60 | Ex. 61 | Ex. 62 | Ex. 63 |
|---|---|---|---|---|---|---|---|
| SiO$_2$ | 58.32 | 63.3 | 63.3 | 63.3 | 63.3 | 63.3 | 63.3 |
| Al$_2$O$_3$ | 18.95 | 15.25 | 15.65 | 16.2 | 15.1 | 15.425 | 15.7 |
| P$_2$O$_5$ | 2.42 | 2.5 | 2.5 | 2.5 | 2.5 | 2.5 | 2.5 |
| Li$_2$O | 4.96 | 6 | 7 | 7.5 | 6 | 7 | 7.5 |
| Na$_2$O | 13.74 | 10.7 | 9.7 | 9.45 | 10.55 | 9.475 | 8.95 |
| ZnO | 1.56 | 1.2 | 0.8 | 0 | 2.5 | 2.25 | 2 |
| MgO | 0.02 | 1 | 1 | 1 | 0 | 0 | 0 |
| SnO$_2$ | 0.03 | 0.05 | 0.05 | 0.05 | 0.05 | 0.05 | 0.05 |
| R$_2$O/Al$_2$O$_3$ | 0.99 | 1.10 | 1.07 | 1.05 | 1.10 | 1.07 | 1.05 |
| Li$_2$O/Na$_2$O | 0.36 | 0.56 | 0.72 | 0.79 | 0.57 | 0.74 | 0.84 |
| (R$_2$O + RO) − Al$_2$O$_3$ − P$_2$O$_5$ | −1.09 | 1.15 | 0.35 | −0.75 | 1.45 | 0.80 | 0.25 |

TABLE 2

Selected physical properties of the glasses listed in Table 1.

| | Ex. 1 | Ex. 2 | Ex. 3 | Ex. 4 | Ex. 5 | Ex. 6 | Ex. 7 |
|---|---|---|---|---|---|---|---|
| Density (g/cm$^3$) | 2.434 | 2.493 | 2.434 | 2.504 | 2.44 | 2.514 | 2.519 |
| Low temperature CTE 25-300° C. (ppm/° C.) | 8.9 | 8.62 | 8.95 | 8.6 | 8.82 | 8.71 | 8.54 |
| High temperature CTE (ppm/° C.) | 17.67 | 19.1 | 17.16 | 21 | 18.12 | 20 | 20.11 |
| Strain pt. (° C.) | 630 | 591 | 612 | 580 | 605 | 580 | 589 |
| Anneal pt. (° C.) | 683 | 641 | 662 | 628 | 651 | 629 | 639 |
| 10$^{11}$ Poise temperature (° C.) | 770 | 725 | 748 | 710 | 734 | 711 | 721 |
| Softening pt. (° C.) | 937 | 888 | 919 | 873 | 909 | 868 | 874 |
| T$^{35\,kP}$ (° C.) | | | | 1167 | 1180 | 1158 | 1160 |
| T$^{200\,kP}$ (° C.) | | | | 1070 | 1083 | 1061 | 1064 |
| Zircon breakdown temperature (° C.) | | 1205 | | 1220 | 1170 | 1185 | 1205 |
| Zircon breakdown viscosity (P) | | | | 1.56 × 10$^4$ | 4.15 × 10$^4$ | 2.29 × 10$^4$ | 1.74 × 10$^4$ |
| Liquidus temperature (° C.) | | 980 | | 990 | 975 | 990 | 1000 |
| Liquidus viscosity (P) | | | | 1.15 × 10$^6$ | 2.17 × 10$^6$ | 9.39 × 10$^5$ | 7.92 × 10$^5$ |
| Poisson's ratio | 0.200 | 0.211 | 0.206 | 0.214 | 0.204 | 0.209 | 0.211 |
| Young's modulus (GPa) | 69.2 | 68.8 | 69.4 | 68.5 | 69.6 | 68.3 | 69.0 |

TABLE 2-continued

Selected physical properties of the glasses listed in Table 1.

| | | | | | | | |
|---|---|---|---|---|---|---|---|
| Refractive index at 589.3 nm | 1.4976 | 1.5025 | 1.4981 | 1.5029 | 1.4992 | 1.5052 | 1.506 |
| Stress optical coefficient (nm/mm/MPa) | 2.963 | 3.158 | 3.013 | 3.198 | 2.97 | 3.185 | 3.234 |

| | Ex. 8 | Ex. 9 | Ex. 10 | Ex. 11 | Ex. 12 | Ex. 13 | Ex. 14 |
|---|---|---|---|---|---|---|---|
| Density (g/cm$^3$) | 2.516 | 2.501 | 2.498 | 2.493 | 2.493 | 2.492 | 2.486 |
| Low temperature CTE 25-300° C. (ppm/° C.) | 8.35 | 8.67 | 8.87 | 8.49 | 8.65 | 8.71 | 8.49 |
| High temperature CTE (ppm/° C.) | 20.11 | 20.6 | 20.94 | | 19.52 | 20.77 | |
| Strain pt. (° C.) | 590 | 589 | 591 | 584 | 600 | 579 | 588 |
| Anneal pt. (° C.) | 641 | 639 | 640 | 628 | 652 | 620 | 630 |
| $10^{11}$ Poise temperature (° C.) | 726 | 724 | 720 | 704 | 738 | 695 | 704 |
| Softening pt. (° C.) | 888 | 890 | 865 | 857 | 900 | 867 | 860 |
| $T^{35\,kP}$ (° C.) | 1170 | 1176 | 1159 | 1139 | 1197 | 1169 | |
| $T^{200\,kP}$ (° C.) | 1073 | 1080 | 1061 | 1041 | 1099 | 1070 | |
| Zircon breakdown temperature (° C.) | 1195 | 1195 | 1210 | 1225 | 1195 | 1195 | 1220 |
| Zircon breakdown viscosity (P) | $2.33 \times 10^4$ | $2.58 \times 10^4$ | $1.60 \times 10^4$ | $9.94 \times 10^3$ | $3.63 \times 10^4$ | $2.35 \times 10^4$ | |
| Liquidus temperature (° C.) | 1005 | 990 | 990 | 980 | 990 | 980 | 980 |
| Liquidus viscosity (P) | $8.69 \times 10^4$ | 1.48E+06 | 9.02E+05 | 7.10E+05 | 2.19E+06 | 1.33E+06 | |
| Poisson's ratio | 0.211 | 0.205 | 0.208 | 0.209 | 0.209 | 0.210 | 0.217 |
| Young's modulus (GPa) | 69.0 | 68.7 | 71.4 | 73.5 | 68.4 | 71.6 | 74.0 |
| Refractive index at 589.3 nm | 1.506 | 1.5036 | 1.505 | 1.5063 | 1.5026 | 1.5041 | 1.5052 |
| Stress optical coefficient (nm/mm/MPa) | 3.234 | 3.194 | 3.157 | 3.131 | 3.18 | 3.156 | 3.131 |

| | Ex. 15 | Ex. 16 | Ex. 17 | Ex. 18 | Ex. 19 | Ex. 20 | Ex. 21 |
|---|---|---|---|---|---|---|---|
| Density (g/cm$^3$) | 2.433 | 2.429 | 2.426 | 2.431 | 2.428 | 2.433 | 2.486 |
| Low temperature CTE 25-300° C. (ppm/° C.) | 9.15 | 9.16 | 8.83 | 8.97 | 8.97 | 8.79 | 8.45 |
| High temperature CTE (ppm/° C.) | 20 | 20 | 21 | 17.3 | 20 | | |
| Strain pt. (° C.) | 615 | 606 | 599 | 633 | 616 | 611 | 602 |
| Anneal pt. (° C.) | 662 | 659 | 653 | 684 | 670 | 665 | 653 |
| $10^{11}$ Poise temperature (° C.) | 747 | 745 | 741 | 771 | 758 | 751 | 739 |
| Softening pt. (° C.) | 935 | 903 | 901 | 943 | 918 | 905 | 910 |
| $T^{35\,kP}$ (° C.) | 1182 | 1166 | 1152 | 1221 | 1185 | 1167 | 1207 |
| $T^{200\,kP}$ (° C.) | 1083 | 1066 | 1051 | 1122 | 1084 | 1066 | 1108 |
| Zircon breakdown temperature (° C.) | | | | | | | |
| Zircon | | | | | | | |

TABLE 2-continued

Selected physical properties of the glasses listed in Table 1.

| | | | | | | | |
|---|---|---|---|---|---|---|---|
| breakdown viscosity (P) | | | | | | | |
| Liquidus temperature (° C.) | | | | | | | |
| Liquidus viscosity (P) | | | | | | | |
| Poisson's ratio | 0.203 | 0.207 | 0.205 | 0.209 | 0.199 | | 0.207 |
| Young's modulus (GPa) | 68.9 | 71.2 | 72.7 | 69.4 | 70.9 | | 68.1 |
| Refractive index at 589.3 nm | 1.4964 | 1.4981 | 1.4991 | 1.4965 | 1.4984 | 1.5006 | 1.5019 |
| Stress optical coefficient (nm/mm/MPa) | 2.994 | 3.022 | 2.982 | 2.979 | 2.99 | 0 | 3.173 |

| | Ex. 22 | Ex. 23 | Ex. 24 | Ex. 25 | Ex. 26 | Ex. 27 | Ex. 28 |
|---|---|---|---|---|---|---|---|
| Density (g/cm$^3$) | 2.468 | 2.448 | 2.434 | 2.428 | 2.47 | 2.419 | 2.414 |
| Low temperature CTE 25-300° C. (ppm/° C.) | 8.6 | 8.23 | 8.91 | 8.25 | 8.66 | 8.52 | 8.17 |
| High temperature CTE (ppm/° C.) | 19.52 | | 19.49 | | | | 19.47 |
| Strain pt. (° C.) | 596 | 595 | 638 | 616 | 608 | 640 | 620 |
| Anneal pt. (° C.) | 644 | 649 | 695 | 656 | 654 | 700 | 677 |
| 10$^{11}$ Poise temperature (° C.) | 728 | 741 | 785 | 732 | 736 | 798 | 771 |
| Softening pt. (° C.) | 905 | 922 | 941 | 925 | 911 | 978 | 946 |
| T$^{35\ kP}$ (° C.) | 1217 | 1227 | 1209 | 1215 | 1209 | 1283 | 1249 |
| T$^{200\ kP}$ (° C.) | 1115 | 1125 | 1109 | 1115 | 1107 | 1184 | 1150 |
| Zircon breakdown temperature (° C.) | 1185 | 1185 | 1180 | 1185 | | | 1185 |
| Zircon breakdown viscosity (P) | 5.86E+04 | 6.91E+04 | 5.59E+04 | 5.72E+04 | | | 1.05E+05 |
| Liquidus temperature (° C.) | 975 | 980 | 1080 | 1025 | | | 940 |
| Liquidus viscosity (P) | 4.14E+06 | 4.52E+06 | 3.56E+05 | 1.27E+06 | | | 2.92E+07 |
| Poisson's ratio | 0.210 | | 0.204 | 0.210 | 0.212 | | 0.213 |
| Young's modulus (GPa) | 71.4 | | 71.6 | 73.5 | 68.8 | | 76.9 |
| Refractive index at 589.3 nm | 1.502 | 1.5025 | 1.4996 | 1.5008 | 1.5006 | 1.4987 | 1.5014 |
| Stress optical coefficient (nm/mm/MPa) | 3.123 | 3.03 | 3.001 | 3.021 | 3.148 | 3.039 | 3.015 |

| | Ex. 29 | Ex. 30 | Ex. 31 | Ex. 32 | Ex. 33 | Ex. 34 | Ex. 35 |
|---|---|---|---|---|---|---|---|
| Density (g/cm$^3$) | 2.408 | 2.446 | 2.448 | 2.446 | 2.445 | 2.443 | 2.442 |
| Low temperature CTE 25-300° C. (ppm/° C.) | 7.86 | 8.29 | 8.38 | 8.17 | 8.14 | 8.04 | 7.97 |
| High temperature CTE (ppm/° C.) | 18.57 | | | | | 19.71 | |
| Strain pt. (° C.) | 610 | 591 | 595 | 585 | 580 | 574 | 577 |
| Anneal pt. (° C.) | 665 | 645 | 649 | 638 | 633 | 627 | 629 |

TABLE 2-continued

Selected physical properties of the glasses listed in Table 1.

| | | | | | | | |
|---|---|---|---|---|---|---|---|
| $10^{11}$ Poise temperature (° C.) | 755 | 736 | 740 | 726 | 722 | 717 | 717 |
| Softening pt. (° C.) | 924 | 915 | 919 | 894 | 894 | 895 | 890 |
| $T^{35\ kP}$ (° C.) | 1216 | 1223 | 1227 | 1216 | 1210 | 1203 | 1196 |
| $T^{200\ kP}$ (° C.) | 1120 | 1122 | 1126 | 1114 | 1108 | 1102 | 1095 |
| Zircon breakdown temperature (° C.) | 1210 | 1175 | 1180 | 1190 | 1195 | 1210 | 1205 |
| Zircon breakdown viscosity (P) | 3.86E+04 | 7.72E+04 | 7.55E+04 | 5.29E+04 | 4.43E+04 | 3.14E+04 | 3.04E+04 |
| Liquidus temperature (° C.) | 1080 | 990 | 975 | 975 | 975 | 975 | 980 |
| Liquidus viscosity (P) | 4.55E+05 | 3.28E+06 | 5.43E+06 | 3.80E+06 | 3.33E+06 | 3.02E+06 | 2.29E+06 |
| Poisson's ratio | 0.211 | 0.206 | 0.202 | 0.21 | 0.204 | 0.204 | 0.203 |
| Young's modulus (GPa) | 75.0 | 73.91 | 73.02 | 74.60 | 74.67 | 75.15 | 75.43 |
| Refractive index at 589.3 nm | 1.5053 | 1.503 | 1.5025 | 1.5035 | 1.5041 | 1.5046 | 1.5053 |
| Stress optical coefficient (nm/mm/MPa) | 3.002 | 3.074 | 3.083 | 3.071 | 3.059 | 3.016 | 3.053 |

| | Ex. 29 | Ex. 30 | Ex. 31 | Ex. 32 | Ex. 33 | Ex. 34 | Ex. 35 |
|---|---|---|---|---|---|---|---|
| Density (g/cm$^3$) | 2.408 | 2.446 | 2.448 | 2.446 | 2.445 | 2.443 | 2.442 |
| Low temperature CTE 25-300° C. (ppm/° C.) | 7.86 | 8.29 | 8.38 | 8.17 | 8.14 | 8.04 | 7.97 |
| High temperature CTE (ppm/° C.) | 18.57 | | | | | 19.71 | |
| Strain pt. (° C.) | 610 | 591 | 595 | 585 | 580 | 574 | 577 |
| Anneal pt. (° C.) | 665 | 645 | 649 | 638 | 633 | 627 | 629 |
| $10^{11}$ Poise temperature (° C.) | 755 | 736 | 740 | 726 | 722 | 717 | 717 |
| Softening pt. (° C.) | 924 | 915 | 919 | 894 | 894 | 895 | 890 |
| $T^{35\ kP}$ (° C.) | 1216 | 1223 | 1227 | 1216 | 1210 | 1203 | 1196 |
| $T^{200\ kP}$ (° C.) | 1120 | 1122 | 1126 | 1114 | 1108 | 1102 | 1095 |
| Zircon breakdown temperature (° C.) | 1210 | 1175 | 1180 | 1190 | 1195 | 1210 | 1205 |
| Zircon breakdown viscosity (P) | 3.86E+04 | 7.72E+04 | 7.55E+04 | 5.29E+04 | 4.43E+04 | 3.14E+04 | 3.04E+04 |
| Liquidus temperature (° C.) | 1080 | 990 | 975 | 975 | 975 | 975 | 980 |
| Liquidus viscosity (P) | 4.55E+05 | 3.28E+06 | 5.43E+06 | 3.80E+06 | 3.33E+06 | 3.02E+06 | 2.29E+06 |
| Poisson's ratio | 0.211 | 0.206 | 0.202 | 0.21 | 0.204 | 0.204 | 0.203 |
| Young's modulus (GPa) | 75.0 | 73.91 | 73.02 | 74.60 | 74.67 | 75.15 | 75.43 |
| Refractive index at 589.3 nm | 1.5053 | 1.503 | 1.5025 | 1.5035 | 1.5041 | 1.5046 | 1.5053 |
| Stress optical coefficient (nm/mm/MPa) | 3.002 | 3.074 | 3.083 | 3.071 | 3.059 | 3.016 | 3.053 |

TABLE 2-continued

Selected physical properties of the glasses listed in Table 1.

|  | Ex. 36 | Ex. 37 | Ex. 38 | Ex. 39 | Ex. 40 | Ex. 41 | Ex. 42 |
|---|---|---|---|---|---|---|---|
| Density (g/cm$^3$) | 2.453 | 2.453 | 2.452 | 2.451 | 2.449 | 2.449 | 2.425 |
| Low temperature CTE 25-300° C. (ppm/° C.) | 8.17 | 8.14 | 7.97 | 8.01 | 7.79 | 7.9 | 8.54 |
| High temperature CTE (ppm/° C.) |  |  |  |  | 20.56 |  |  |
| Strain pt. (° C.) | 595 | 595 | 584 | 587 | 578 | 584 | 617 |
| Anneal pt. (° C.) | 649 | 649 | 638 | 640 | 630 | 637 | 663 |
| 10$^{11}$ Poise temperature (° C.) | 740 | 741 | 729 | 730 | 718 | 726 | 746 |
| Softening pt. (° C.) | 918 | 921 | 905 | 907 | 894 | 901 | 929 |
| T$^{35\ kP}$ (° C.) | 1229 | 1232 | 1212 | 1219 | 1200 | 1204 | 1232 |
| T$^{200\ kP}$ (° C.) | 1128 | 1131 | 1111 | 1118 | 1100 | 1103 | 1132 |
| Zircon breakdown temperature (° C.) | 1185 |  | 1200 |  | 1210 |  |  |
| Zircon breakdown viscosity (P) | 7.20E+04 |  | 4.26E+04 |  | 3.00E+04 |  |  |
| Liquidus temperature (° C.) | 995 |  | 990 |  | 965 |  |  |
| Liquidus viscosity (P) | 3.33E+06 |  | 2.51E+06 |  | 3.71E+06 |  |  |
| Poisson's ratio | 0.208 |  | 0.206 |  | 0.206 |  |  |
| Young's modulus (GPa) | 73.70 |  | 74.67 |  | 75.50 |  |  |
| Refractive index at 589.3 nm | 1.5032 |  | 1.5042 |  | 1.5054 |  | 1.5005 |
| Stress optical coefficient (nm/mm/MPa) | 3.093 |  | 3.071 |  | 3.072 |  | 3.033 |

|  | Ex. 43 | Ex. 44 | Ex. 45 | Ex. 46 | Ex. 47 | Ex. 48 | Ex. 49 | Ex. 50 |
|---|---|---|---|---|---|---|---|---|
| Density (g/cm$^3$) | 2.424 | 2.422 | 2.455 | 2.454 | 2.454 | 2.434 | 2.439 | 2.443 |
| Low temperature coefficient of thermal expansion 25 - 300° C. (ppm/° C.) | 8.48 | 8.34 | 8.03 | 7.88 | 7.76 | 7.87 | 7.71 | 7.63 |
| High temperature coefficient of thermal expansion (ppm/° C.) |  |  |  |  |  |  |  |  |
| Strain pt. temperature (° C.) | 614 | 594 | 595 | 586 | 579 | 580 | 581 | 579 |
| Anneal pt. temperature (° C.) | 659 | 640 | 649 | 639 | 630 | 633 | 633 | 632 |
| 10$^{11}$ Poise temperature (° C.) | 739 | 722 | 740 | 729 | 718 | 722 | 721 | 721 |
| Softening pt. temperature (° C.) | 912 | 899 | 918 | 909 | 898 | 892 | 893 | 895 |
| 35 kP temperature (° C.) | 1216 | 1204 |  | 1212 | 1200 | 1203 | 1203 | 1203 |
| 200 kP temperature (° C.) | 1116 | 1102 |  | 1113 | 1099 | 1105 | 1102 | 1103 |

TABLE 2-continued

Selected physical properties of the glasses listed in Table 1.

| | | | | | | | | |
|---|---|---|---|---|---|---|---|---|
| Zircon breakdown temperature (° C.) | | | | | | | | |
| Zircon breakdown viscosity (P) | | | | | | | | |
| Liquidus temperature (° C.) | | 985 | | 965 | 1005 | 1010 | 1030 | |
| Liquidus viscosity (P) | | | | 4.E+06 | 1.78E+06 | 1.34E+06 | 8.98E+05 | |
| Poisson's ratio | | | | | 0.211 | 0.21 | 0.213 | |
| Young's modulus (GPa) | | | | | 76.32 | 76.60 | 76.81 | |
| Refractive index at 589.3 nm | 1.5014 | 1.5026 | 1.5036 | 1.5047 | 1.5061 | 1.505 | 1.5059 | 1.5064 |
| Stress optical coefficient (nm/mm/MPa) | 2.965 | 2.981 | 3.082 | 3.057 | 3.063 | 3.025 | 3.004 | 3.046 |

| | Ex. 51 | Ex. 52 | Ex. 53 | Ex. 54 | Ex. 55 | Ex. 56 | Ex. 57 |
|---|---|---|---|---|---|---|---|
| Density (g/cm$^3$) | 2.424 | 2.431 | 2.403 | 2.4 | 2.45 | 2.462 | 2.468 |
| Low temperature CTE 25-300° C. (ppm/° C.) | 77.1 | 76.1 | 74.3 | 73.1 | 80.2 | 79.7 | 83.6 |
| High temperature CTE (ppm/° C.) | | | | | | | |
| Strain pt. (° C.) | 588 | 599 | 611 | 612 | 580 | 611 | 597 |
| Anneal pt. (° C.) | 640 | 651 | 665 | 665 | 631 | 663 | 649 |
| $10^{11}$ Poise temperature (° C.) | 728 | 738 | 753 | 752 | 718 | 750 | 735 |
| Softening pt. (° C.) | 900.4 | 907.5 | 916 | 912.5 | 892.2 | 915.6 | 899.4 |
| $T^{35\ kP}$ (° C.) | 1204 | 1209 | 1209 | 1202 | 1206 | 1205 | 1184 |
| $T^{200\ kP}$ (° C.) | 1106 | 1113 | 1113 | 1106 | 1102 | 1111 | 1093 |
| Zircon breakdown temperature (° C.) | | | | | | | |
| Zircon breakdown viscosity (P) | | | | | | | |
| Liquidus temperature (° C.) | 1060 | 1115 | 1160 | 1205 | | | |
| Liquidus viscosity (P) | 5.11E+05 | 1.90E+05 | 8.18E+04 | 3.32E+04 | | | |
| Poisson's ratio | 0.211 | 0.212 | 0.208 | 0.214 | | | |
| Young's modulus (GPa) | 77.01 | 78.05 | 77.57 | 78.74 | | | |
| Refractive index at 589.3 nm | 1.5054 | 1.5055 | 1.5059 | 1.5072 | | | |
| Stress optical coefficient (nm/mm/MPa) | 3.011 | 2.98 | 2.982 | 2.964 | | | |

Each of the oxide components of the base (or unstrengthened) and strengthened (i.e., chemically strengthened by ion exchange) alkali aluminosilicate glass articles described herein serves a function and/or has an effect on the manufacturability and physical properties of the glass. Silica ($SiO_2$), for example, is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In one or more embodiments, the alkali aluminosilicate glass article comprises $SiO_2$ in an amount in a range from about 58 mol % to about 65 mol %, from about 59 mol % to about 65 mol %, from about 60 mol % to about 65 mol %, from about 61 mol % to about 65 mol %, from about 62 mol % to about 65 mol %, from about 63 mol % to about 65 mol %, from about 58 mol % to about 64 mol %, from about 58 mol % to about 63 mol %, from about 58 mol % to about 62 mol %, from about 58 mol % to about 61 mol %, from about 58 mol % to about 60 mol %, from about 63 mol % to about 65 mol %, from about 63.2 mol % to about 65 mol %, or from about 63.3 mol % to about 65 mol %.

In addition to silica, the alkali aluminosilicate glass articles described herein comprise the network formers $Al_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination, which increases the packing density of the glass network and thus increases the compressive stress resulting from chemical strengthening. In one or more embodiments, the alkali aluminosilicate glass article comprises $Al_2O_3$ in an amount in a range from about 11 mol % to about 20 mol %, from about 12 mol % to about 20 mol %, from about 13 mol % to about 20 mol %, from about 14 mol % to about 20 mol %, from about 15 mol % to about 20 mol %, from about 11 mol % to about 19 mol %, from about 11 mol % to about 18.5 mol %, from about 11 mol % to about 18 mol %, from about 11 mol % to about 17.5 mol %, from about 11 mol % to about 17 mol %, from about 11 mol % to about 16.5 mol %, from about 11 mol % to about 16 mol %, from about 14 mol % to about 17 mol %, from about 15 mol % to about 17 mol %, or from about 15 mol % to about 16 mol %.

Phosphorous pentoxide ($P_2O_5$) is a network former incorporated in the alkali aluminosilicate glass articles described herein. $P_2O_5$ adopts a quasi-tetrahedral structure in the glass network; i.e., it is coordinated with four oxygen atoms, but only three of which are connected to the rest of the network. The fourth oxygen atom is a terminal oxygen that is doubly bound to the phosphorous cation. The incorporation of $P_2O_5$ in the glass network is highly effective at reducing Young's modulus and shear modulus. Incorporating $P_2O_5$ in the glass network also reduces the high temperature CTE, increases the ion-exchange interdiffusion rate, and improves glass compatibility with zircon refractory materials. In one or more embodiments, the alkali aluminosilicate glass article comprises $P_2O_5$ in an amount in a range from about 0.5 mol % to about 5 mol %, from about 0.6 mol % to about 5 mol %, from about 0.8 mol % to about 5 mol %, from about 1 mol % to about 5 mol %, from about 1.2 mol % to about 5 mol %, from about 1.4 mol % to about 5 mol %, from about 1.5 mol % to about 5 mol %, from about 1.6 mol % to about 5 mol %, from about 1.8 mol % to about 5 mol %, from about 2 mol % to about 5 mol %, from about 0.5 mol % to about 3 mol %, from about 0.6 mol % to about 3 mol %, from about 0.8 mol % to about 3 mol %, from about 1 mol % to about 3 mol %, from about 1.2 mol % to about 3 mol %, from about 1.4 mol % to about 3 mol %, from about 1.5 mol % to about 3 mol %, from about 1.6 mol % to about 3 mol %, from about 1.8 mol % to about 3 mol %, from about 2 mol % to about 3 mol %, from about 0.5 mol % to about 2.8 mol %, from about 0.5 mol % to about 2.6 mol %, from about 0.5 mol % to about 2.5 mol %, from about 0.5 mol % to about 2.4 mol %, from about 0.5 mol % to about 2.2 mol %, from about 0.5 mol % to about 2 mol %, from about 2.5 mol % to about 5 mol %, from about 2.5 mol % to about 4 mol %, or from about 2.5 mol % to about 3 mol %.

The alkali aluminosilicate glass articles described herein described herein do not contain boron oxide ($B_2O_3$), or are free of $B_2O_3$ as its presence has a negative impact on compressive stress when the glass is strengthened by ion exchange. As used herein, the phrase "free of $B_2O_3$" means the alkali aluminosilicate glass articles described herein include less than about 0.1 mol % $B_2O_3$, less than about 0.05 mol % $B_2O_3$ or less than about 0.01 mol %.

The alkali oxide $Na_2O$ is used to achieve chemical strengthening of the alkali aluminosilicate glass articles described herein by ion exchange. The alkali aluminosilicate glass articles described herein include $Na_2O$, which provides the Na+ cation to be exchanged for potassium cations present in a salt bath containing, for example, $KNO_3$. In some embodiments, the alkali aluminosilicate glass articles described herein comprise from about 4 mol % to about 20 mol % $Na_2O$. In one or more embodiments, the alkali aluminosilicate glass article comprises $Na_2O$ in an amount in a range from about 4.5 mol % to about 20 mol %, from about 5 mol % to about 20 mol %, from about 5.5 mol % to about 20 mol %, from about 6 mol % to about 20 mol %, from about 6.5 mol % to about 20 mol %, from about 7 mol % to about 20 mol %, from about 7.5 mol % to about 20 mol %, from about 8 mol % to about 20 mol %, from about 8.5 mol % to about 20 mol %, from about 9 mol % to about 20 mol %, from about 9.5 mol % to about 20 mol %, from about 10 mol % to about 20 mol %, from about 4 mol % to about 19.5 mol %, from about 4 mol % to about 19 mol %, from about 4 mol % to about 18.5 mol %, from about 4 mol % to about 18 mol %, from about 4 mol % to about 17.5 mol %, from about 4 mol % to about 17 mol %, from about 4 mol % to about 16.5 mol %, from about 4 mol % to about 16 mol %, from about 4 mol % to about 15.5 mol %, from about 4 mol % to about 15 mol %, from about 4 mol % to about 14.5 mol %, from about 4 mol % to about 14 mol %, from about 6 mol % to about 18 mol %, from about 7 mol % to about 18 mol %, from about 8 mol % to about 18 mol %, from about 9 mol % to about 18 mol %, from about 6 mol % to about 12 mol %, from about 6 mol % to about 11 mol %, or from about 6 mol % to about 10 mol %.

The alkali aluminosilicate glass articles described herein may, in some embodiments, further include up to about 13 mol % $Li_2O$ or up to about 10 mol % $Li_2O$. In some embodiments, the alkali aluminosilicate glass articles comprise $Li_2O$ in an amount in a range from about 0 mol % to about 9.5 mol %, from about 0 mol % to about 9 mol %, from about 0 mol % to about 8.5 mol %, from about 0 mol % to about 8 mol %, from about 0 mol % to about 7.5 mol %, from about 0 mol % to about 7 mol %, from about 0.1 mol % to about 10 mol %, from about 0.1 mol % to about 9.5 mol %, from about 0.1 mol % to about 9 mol %, from about 0.1 mol % to about 8.5 mol %, from about 0.1 mol % to about 8 mol %, from about 0.1 mol % to about 7.5 mol %, from about 0.1 mol % to about 7 mol %, or from about 4 mol % to about 8 mol %. When substituted for $Na_2O$, $Li_2O$ reduces the zircon breakdown temperature and softens the glass, which allows additional $Al_2O_3$ to be added to the glass. In certain embodiments, the alkali aluminosilicate glass articles are free of $Li_2O$ (i.e., contain 0 mol % $Li_2O$), or substantially free of $Li_2O$. In the alkali aluminosilicate glass articles described herein, the amount of $Na_2O$ present exceeds that of $Li_2O$, where $Li_2O$ (mol %)/$Na_2O$ (mol %)<1. In some embodiments, $Li_2O$ (mol %)/$Na_2O$ (mol %)<0.75. In some embodiments, $R_2O$ (mol %)/$Al_2O_3$ (mol %)<2, and, in some embodiments, $0.9 \leq R_2O$ (mol %)/$Al_2O_3$ (mol %) 1.6, where $R_2O = Li_2O + Na_2O$.

The presence of potassium oxide in the glass has a negative effect on the ability of to achieve high levels of surface compressive stress in the glass through ion exchange. The alkali aluminosilicate glass articles described herein, as originally formed, therefore do not contain $K_2O$ or are free of K$_2$O. In one or more embodiments, the alkali aluminosilicate glass articles include less than about 0.2 mol % K$_2$O. However, when ion exchanged in a potassium-containing molten salt (e.g., containing KNO$_3$) bath, the alkali aluminosilicate glasses may include some amount of K$_2$O (i.e., less than about 1 mol %), with the actual amount depending upon ion exchange conditions (e.g., potassium salt concentration in the ion exchange bath, bath temperature, ion exchange time, and the extent to which K$^+$ ions replace Li$^+$ and Na$^+$ ions). The resulting compressive layer will contain potassium—the ion-exchanged layer near the surface of the glass may contain 10 mol % or more K$_2$O at the glass surface, while the bulk of the glass at depths greater than the depth of the compressive layer remains essentially potassium-free.

In some embodiments, the alkali aluminosilicate glass articles described herein may comprise from 0 mol % up to about 6 mol % ZnO (e.g., from about 0 mol % to about 5 mol %, from about 0 mol % to about 4 mol %, from about 0 mol % to about 3.5 mol %, from about 0 mol % to about 3 mol %, from about 0 mol % to about 2.5 mol %, from about 0.1 mol % to about 6 mol %, from about 0.1 mol % to about 5 mol %, from about 0.1 mol % to about 4 mol %, from about 0.1 mol % to about 3.5 mol %, from about 0.1 mol % to about 3 mol %, from about 0.1 mol % to about 2.5 mol %, from about 0.1 mol % to about 2 mol %, from about 1 mol % to about 5 mol %, from about 2 mol % to about 5 mol %, from about 1 mol % to about 3 mol %, from about 1.5 mol % to about 3 mol %, from about 2 mol % to about 3 mol %, or from about 1 mol % to about 2 mol %). The divalent oxide ZnO improves the melting behavior of the glass by reducing the temperature at 200 poise viscosity (200 P temperature). ZnO also is beneficial in improving the strain point when compared to like additions of P$_2$O$_5$, and/or Na$_2$O.

Alkaline earth oxides such as MgO and CaO, may also be substituted for ZnO to achieve a similar effect on the 200 P temperature and strain point. When compared to MgO and CaO, however, ZnO is less prone to promoting phase separation in the presence of P$_2$O$_5$. In some embodiments, the glasses described herein include from 0 mol % up to 6 mol % MgO or, in other embodiments, these glasses comprise from 0.02 mol % to about 6 mol % MgO. While other alkaline earth oxides, including SrO and BaO, may also be substituted for ZnO, they are less effective in reducing the melt temperature at 200 poise viscosity than ZnO, MgO, or CaO and are also less effective than ZnO, MgO, or CaO at increasing the strain point.

In some embodiments, the alkali aluminosilicate glass articles described herein are formable by down-draw processes that are known in the art, such as slot-draw and fusion-draw processes. The glass compositions used to form the alkali aluminosilicate glass articles may contain small concentrations of Li$_2$O and are compatible with the fusion-draw process and can be manufactured without issue. The lithium may be batched in the melt as either spodumene or lithium carbonate.

The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass composition must have a sufficiently high liquidus viscosity (i.e., the viscosity of a molten glass at the liquidus temperature). In some embodiments, compositions used to form the alkali aluminosilicate glass articles described herein have a liquidus viscosity of at least about 200 kilopoise (kP) and, in other embodiments, at least about 600 kP.

After the alkali aluminosilicate glass articles are formed, the article may be chemically strengthened. Ion exchange is widely used to chemically strengthen glasses. In one particular example, alkali cations within a source of such cations (e.g., a molten salt, or "ion exchange," bath) are exchanged with smaller alkali cations within the glass to achieve a layer that is under a compressive stress near the surface of the glass article. The compressive layer extends from the surface to a DOL within the glass article. In the alkali aluminosilicate glass articles described herein, for example, potassium ions from the cation source are exchanged for sodium ions within the glass during ion exchange by immersing the glass in a molten salt bath comprising a potassium salt such as, but not limited to, potassium nitrate (KNO$_3$). Other potassium salts that may be used in the ion exchange process include, but are not limited to, potassium chloride (KCl), potassium sulfate (K$_2$SO$_4$), combinations thereof, and the like. The ion exchange baths described herein may contain alkali ions other than potassium and the corresponding salts. For example, the ion exchange bath may also include sodium salts such as sodium nitrate (NaNO$_3$), sodium sulfate, sodium chloride, or the like. In one or more embodiments, a mixture of two different salts may be utilized. For example, the glass articles may be immersed in a salt bath of KNO$_3$ and NaNO$_3$. In some embodiments, more than one bath may be used with the glass being immersed in one bath followed by another, successively. The baths may have the same or different compositions, temperatures and/or may be used for different immersion times.

The ion exchange bath may have a temperature in the range from about 320° C. to about 450° C. Immersion time in the bath may vary from about 15 minutes to about 16 hours.

While the embodiment shown in FIG. 1 depicts a strengthened alkali aluminosilicate glass article 100 as a flat planar sheet or plate, the alkali aluminosilicate glass article may have other configurations, such as three dimensional shapes or non-planar configurations. The strengthened alkali aluminosilicate glass article 100 has a first surface 110 and a second surface 112 defining a thickness t. In one or more embodiments, (such as the embodiment shown in FIG. 1) the strengthened alkali aluminosilicate glass article is a sheet including first surface 110 and opposing second surface 112 defining thickness t. The strengthened alkali aluminosilicate glass article 100 has a first compressive layer 120 extending from first surface 110 to a depth of layer d$_1$ into the bulk of the glass article 100. In the embodiment shown in FIG. 1, the strengthened alkali aluminosilicate glass article 100 also has a second compressive layer 122 extending from second surface 112 to a second depth of layer $d_2$. Glass article also has a central region 330 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the strengthened alkali aluminosilicate glass article 100 from the propagation of flaws introduced by sharp impact to first and second surfaces 110, 112 of the strengthened alkali aluminosilicate glass article 100, while the compressive stress minimizes the likelihood of a flaw penetrating through the depth $d_1$, $d_2$ of first and second compressive layers 120, 122. DOL d1 and DOL d2 may be equal to one another or different from one another. In some embodiments, at least a portion of the central region (e.g., the portion extending from the DOL to a depth equal to 0.5 times the thickness of the article) may be free of $K_2O$ (as defined herein).

The DOL may be described as a fraction of the thickness t (which is otherwise described herein as being in a range from about 0.05 mm to about 1.5 mm) For example, in one or more embodiments, the DOL may be equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, the DOL may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOL may be about 20 μm or less. In one or more embodiments, the DOL may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the strengthened alkali aluminosilicate glass article may have a maximum compressive stress (which may be found at the surface or a depth within the glass article) of about 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened alkali aluminosilicate glass article may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

The alkali aluminosilicate glass articles described herein are, in some embodiments, ion-exchanged by immersion in a molten salt bath comprising or consisting essentially of about 100% $KNO_3$ by weight (small amounts of additives such as silicic acid or the like may be added to the bath). In order to maximize the surface compressive stress, the glasses may undergo a heat treatment followed by ion exchange. For articles having a thickness of about 1 mm, the articles are ion exchanged for 45 minutes at 410° C. The glass articles are heat treated at the $10^{11}$ Poise (P) temperature and rapidly quenched to set the fictive temperature to approximately $10^{11}$ P viscosity temperature prior to ion-exchange. This is done to set the fictive temperature to represent the thermal history of a fusion drawn sheet. Table 3 lists the compressive stresses, depths of compressive layer, and bend radii measured for the samples listed in Table 1 following ion exchange under the above conditions. When subjected to this combination of heat treatment followed by ion exchange, the alkali aluminosilicate glass articles described herein have a compressive layer having a maximum compressive stress CS of at least about 1050 MPa and a depth of compressive layer DOL of less than about 25 μm or, in some embodiments, less than about 20 μm. In some embodiments, the depth of the compressive layer is at least about 9 μm.

TABLE 3

Compressive stresses, depths of compressive layer, and bend radii measured for 1 mm thick samples, having compositions listed in Table 1, following setting the fictive temperature $T_F$ to equal the $10^{11}$ P viscosity temperature and ion exchange at 410° C. for 45 minutes in a 100 wt % $KNO_3$ molten salt bath.

| Example | Compressive Stress (MPa) | Depth of Layer (μm) | Bend radius[1] (mm) |
|---|---|---|---|
| 1 | 1025 | 22 | 35.2 |
| 2 | 1026 | 22 | 35.1 |
| 3 | 972 | 21 | 37.3 |
| 4 | 997 | 20 | 36.0 |
| 5 | 1047 | 18 | 34.7 |
| 6 | 1006 | 19 | 35.5 |
| 7 | 1024 | 18 | 35.3 |
| 8 | 1024 | 18 | 35.3 |
| 9 | 1020 | 21 | 35.2 |
| 10 | 1045 | 17 | 35.7 |
| 11 | 1030 | 15 | 37.3 |
| 12 | 1066 | 22 | 33.5 |
| 13 | 1078 | 17 | 34.8 |
| 14 | 1040 | 15 | 37.4 |
| 15 | 1039 | 24 | 34.6 |
| 16 | 960 | 21 | 38.8 |
| 17 | 1035 | 20 | 36.7 |
| 18 | 1072 | 21 | 33.9 |
| 19 | 971 | 21 | 38.1 |
| 20 |  | 17 |  |
| 21 | 1069 | 22 | 33.3 |
| 22 | 1104 | 19 | 33.8 |

TABLE 3-continued

Compressive stresses, depths of compressive layer, and bend radii measured for 1 mm thick samples, having compositions listed in Table 1, following setting the fictive temperature $T_F$ to equal the $10^{11}$ P viscosity temperature and ion exchange at 410° C. for 45 minutes in a 100 wt % $KNO_3$ molten salt bath.

| Example | Compressive Stress (MPa) | Depth of Layer (μm) | Bend radius[1] (mm) |
|---|---|---|---|
| 23 | 1105 | 17 | |
| 24 | 1133 | 22 | 32.9 |
| 25 | 1145 | 18 | 33.6 |
| 26 | 1049 | 23 | 34.3 |
| 27 | 1097 | 21 | |
| 28 | 1096 | 16 | 36.7 |
| 29 | 1099 | 13 | 35.7 |
| 30 | 1083 | 15 | 35.6 |
| 31 | 1080 | 16 | 35.2 |
| 32 | 1136 | 14 | 34.3 |
| 33 | 1078 | 13 | 36.1 |
| 34 | 1097 | 12 | 35.7 |
| 35 | 1078 | 12 | 36.5 |
| 36 | 1079 | 15 | 35.7 |
| 37 | | | |
| 38 | 1095 | 13 | 35.6 |
| 39 | | | |
| 40 | 1087 | 12 | 36.3 |
| 41 | | | |
| 42 | 1113 | 18 | |
| 43 | | | |
| 44 | 1127 | 14 | |
| 45 | 1086 | 14 | |
| 46 | 1113 | 13 | |
| 47 | 1106 | 11 | |
| 48 | 1105 | 11 | 36.2 |
| 49 | 1115 | 11 | 35.9 |
| 50 | 1097 | 10 | 36.7 |
| 51 | 1112 | 11 | 36.2 |
| 52 | 1121 | 11 | 36.4 |
| 53 | 1116 | 10 | 36.3 |
| 53 | 1127 | 9 | 36.6 |

[1]Bend radius (mm) required on ion exchanged glass samples to reduce net surface stress to 0 MPa.

In other embodiments, the alkali aluminosilicate glass articles described herein may be ion exchanged to achieve a deeper depth of compressive layer. For example, selected samples (the compositions of which are listed in Table 1), each having a thickness of 1 mm, were ion exchanged for 8 hours at 410° C. in a molten salt bath comprising or consisting essentially of about 100% $KNO_3$ to achieve depths of layer of at least about 30 μm or, in some embodiments, at least about 40 μm, and, in still other embodiments, a depth of at least about 50 μm with a maximum compressive stress of at least about 930 MPa. Compressive stresses and depths of compressive layer measured for these samples following ion exchange under these conditions are listed in Table 4.

TABLE 4

Compressive stresses and depths of compressive layer measured for 1 mm thick samples, having compositions listed in Table 1, following setting the fictive temperature $T_F$ to equal the $10^{11}$ P viscosity temperature and ion exchange at 410° C. for 8 hours in a 100 wt % $KNO_3$ molten salt bath.

| Example | Compressive Stress (MPa) | Depth of Layer (μm) |
|---|---|---|
| 30 | 955 | 54 |
| 33 | 941 | 48 |
| 35 | 938 | 42 |
| 36 | 979 | 52 |
| 38 | 977 | 47 |
| 45 | 990 | 50 |
| 46 | 978 | 45 |
| 51 | 937 | 40 |
| 52 | 948 | 38 |
| 53 | 936 | 37 |
| 54 | 952 | 32 |

In still other embodiments, the alkali aluminosilicate glass articles described herein may be ion exchanged so as to obtain a deep depth of compressive layer and a stress profile that is parabolic or closely approximates a parabolic in the central tensile region of the glass. For example, selected samples (the compositions of which are listed in Table 1), each having a thickness of 1 mm, were ion exchanged for 2, 4, or 16 hours at 430° C. in a molten salt bath comprising or consisting essentially of about 100% $NaNO_3$ to achieve depths of compressive layer DOL of at least about 200 μm or, in some embodiments, up to about 25% of the total sample thickness t (i.e., DOL≤0.25 t) and, in some embodiments, up to about 20% of the total sample thickness t (i.e., DOL≤0.2 t) with a maximum tensile stress of at least about 30 MPa, or, in some embodiments, at least about 35 MPa or, in some embodiments, at least about 56 MPa, or, in still other embodiments, at least about 66 MPa. Central tensions and depths of compressive layer measured for these samples following ion exchange under these conditions are listed in Table 5.

TABLE 5

Central tensions and depths of compressive layer measured for selected samples (the compositions of which are listed in Table 1), each having a thickness of 1 mm, following ion exchange for 2, 4, or 16 hours at 430° C. in a molten salt bath comprising about 100 wt % $NaNO_3$.

| | Ex. 34 | Ex. 40 | Ex. 47 | Ex. 48 | Ex. 49 | Ex. 50 |
|---|---|---|---|---|---|---|
| Ion exchange for 2 hours at 430° C. in 100% $NaNO_3$ | | | | | | |
| Central Tension (MPa) | | | 62 | 71 | 68 | 69 |
| Depth of Layer (μm) | | | 200 | 200 | 200 | 160 |
| Ion exchange for 4 hours at 430° C. in 100% $NaNO_3$ | | | | | | |
| Central Tension (MPa) | 58 | 59 | 56 | 63 | 70 | 66 |
| Depth of Layer (μm) | 200 | 200 | 200 | 200 | 200 | 200 |
| Ion exchange for 16 hours at 430° C. in 100% $NaNO_3$ | | | | | | |
| Central Tension (MPa) | 40 | 38 | 41 | 37 | 41 | 40 |
| Depth of Layer (μm) | 200 | 200 | 200 | 200 | 200 | 200 |

The ion-exchange compressive stress can further be improved by annealing at the $10^{13.18}$ Poise temperature (the anneal point temperature) for 30 minutes prior to ion-exchange. By relaxing the structure to a lower fictive temperature state, the packing density of the glass is increased, thus allowing for higher surface compressive stress through ion-exchange (at the expense of diffusivity).

The alkali aluminosilicate glass articles described herein exhibit substantially higher surface compressive stresses than other the alkali aluminosilicate glass articles in both the fusion state (Fictive temperature $(T_f)=10^{11}$ Poise temperature) and annealed state (Fictive temperature=$10^{13.8}$ Poise temperature). Table 5 lists compressive stress CS, depth of the compressive layer, and the bend radius required to cancel out surface compressive stress on a 1 mm thick glass for two examples (examples 34 and 40) of the ion exchanged glasses described herein and a comparative example having a nominal composition of 69 mol % $SiO_2$, 10 mol % $Al_2O_3$, 15 mol % $Na_2O$, 0.01 mol %, 5.5 mol % MgO, and 0.2 mol % $SnO_2$. The comparative example is described in U.S. patent application Ser. No. 13/533,298, entitled "Ion Exchangeable Glass with High Compressive Stress", filed Jun. 26, 2012, by Matthew John Dejneka et al. All samples were heat treated at the anneal point temperature (temperature at the viscosity equals $10^{13.18}$ P) for 30 minutes prior to ion-exchange. The samples were ion exchanged at 410° C. for 45 minutes in a molten $KNO_3$ salt bath.

As can be seen from Table 5, the comparative example was ion exchanged to achieve a compressive stress of 1118, whereas the glasses described in the present disclosure were ion exchanged under the same conditions to achieve compressive stresses of 1203 MPa and 1192 MPa. For glasses having higher surface compressive stress, the strength will be higher for a given flaw size, and surface flaws remain under compression at tighter bend radius, thus preventing fatigue (subcritical crack growth) of small flaws.

Since the small surface flaws under compression cannot extend to failure, glasses with higher surface compressive stress are generally more resistant to failure from bending events, although exceptions may occur for glasses with ultra-high modulus. The bend-induced stress has to overcome the surface compressive stress to place the surface flaws into tension. When bending a glass plate, the bend induced tensile stress at the surface is given by the following equation:

$$\sigma = \frac{E}{1-v^2}\frac{h}{2}\frac{1}{R},$$

where σ is the tensile stress on the outer surface of the glass, E is the Young's modulus of the glass, v is Poisson's ratio, h is the thickness of the glass, and R is the bend radius to the outer surface of the glass. The above equation may be rearranged to determine the bend radius required to reduce the ion-exchange surface stress to zero:

$$R = \frac{E}{1-v^2}\frac{h}{2}\frac{1}{\sigma_{IOX}}$$

Glasses that require a smaller bend radius to overcome the ion-exchange surface stress are more resistant to bend induced failure by propagation of surface flaws. Calculating the R value for the glass of the above comparative example (E=71.3, Poisson's ratio=0.205, IOX surface stress=1014 MPa), we determine that a bend radius of 36.7 mm will reduce the surface stress to 0 MPa. In contrast, the examples listed in Table 1 of glasses described hereinabove with $T_F=10^{11}$ P temperature will require a bend radius of less than 36 mm to reduce the net surface stress to 0 MPa.

TABLE 5

Results of ion exchange of glass samples.

|  | Comparative example | Ex. 34 | Ex. 40 |
| --- | --- | --- | --- |
| CS (MPa) | 1118 | 1203 | 1192 |
| DOL (μm) | 12 | 11 | 10 |
| Bend radius (mm) | 33.3 | 32.6 | 33.1 |

Table 6 lists exemplary compositions of the alkali aluminosilicate glass articles described herein. Table 7 lists selected physical properties determined for the examples listed in Table 6. The physical properties listed in Table 7 include: density; CTE; strain, anneal and softening points; liquidus temperature; liquidus viscosity; Young's modulus; refractive index, and stress optical coefficient.

TABLE 6

Examples of alkali aluminosilicate glass articles.

| Composition (mol %) | Ex. 58 | Ex. 59 | Ex. 60 | Ex. 61 | Ex. 62 | Ex. 63 | Ex. 64 |
| --- | --- | --- | --- | --- | --- | --- | --- |
| $Al_2O_3$ | 16.67 | 16.73 | 16.70 | 16.73 | 16.17 | 16.13 | 15.73 |
| $B_2O_3$ |  |  |  |  |  |  |  |
| $Cs_2O$ |  |  |  | 0.46 |  |  |  |
| $Li_2O$ | 7.46 | 7.41 | 7.30 | 7.42 | 7.45 | 7.54 | 7.45 |
| $Na_2O$ | 8.75 | 8.28 | 7.77 | 7.85 | 8.30 | 7.76 | 8.77 |
| $P_2O_5$ | 3.46 | 3.95 | 3.94 | 3.92 | 3.45 | 3.94 | 3.38 |
| $SiO_2$ | 63.62 | 63.58 | 64.24 | 63.56 | 63.61 | 63.61 | 63.71 |
| $SnO_2$ | 0.05 | 0.05 | 0.05 | 0.05 | 0.05 | 0.05 |  |
| ZnO |  |  |  |  | 0.98 | 0.97 | 0.96 |
| $R_2O$ | 16.21 | 15.69 | 15.07 | 15.27 | 15.75 | 15.30 | 16.22 |
| $B_2O_3$ + $P_2O_5$ + $SiO_2$ + $Al_2O_3$ | 83.74 | 84.26 | 84.88 | 84.22 | 83.23 | 83.68 | 82.82 |

| Composition (mol %) | Ex. 65 | Ex. 66 | Ex. 67 |
| --- | --- | --- | --- |
| $Al_2O_3$ | 15.65 | 16.68 | 16.66 |
| $B_2O_3$ |  |  |  |
| $Cs_2O$ |  |  |  |
| $Li_2O$ | 7.47 | 9.99 | 12.38 |
| $Na_2O$ | 8.27 | 7.32 | 4.84 |
| $P_2O_5$ | 3.91 | 2.45 | 2.44 |
| $SiO_2$ | 63.67 | 63.50 | 63.63 |
| $SnO_2$ | 0.05 | 0.05 | 0.05 |
| ZnO | 0.98 |  |  |
| R2O | 15.74 | 17.31 | 17.22 |
| $B_2O_3$ + $P_2O_5$ + $SiO_2$ + $Al_2O_3$ | 83.23 | 82.64 | 82.73 |

TABLE 7

Selected physical properties of the glasses listed in Table 6.

| | Ex. 58 | Ex. 59 | Ex. 60 | Ex. 61 | Ex. 62 | Ex. 63 | Ex. 64 |
|---|---|---|---|---|---|---|---|
| Fulchers A | −3.933 | −3.681 | −3.994 | −4.132 | −4.049 | −3.657 | −4.147 |
| Fulchers B | 10000.7 | 9453.7 | 10199.7 | 10556.7 | 10414.5 | 9531.9 | 10785.5 |
| Fulchers To | 50.4 | 85.5 | 41.3 | 22.6 | −0.8 | 50.1 | −38.5 |
| 200 P Temperature (° C.) | 1655 | 1666 | 1662 | 1664 | 1639 | 1650 | 1634 |
| 35000 P Temperature (° C.) | 1230 | 1235 | 1236 | 1239 | 1211 | 1212 | 1202 |
| 200000 P Temperature (° C.) | 1133 | 1138 | 1139 | 1142 | 1113 | 1114 | 1103 |
| Density (g/cm$^3$) | 2.396 | 2.389 | 2.389 | 2.413 | 2.413 | 2.406 | 2.415 |
| CTE 25-300° C. (ppm/° C.) | 73.9 | 71.7 | 72.5 | 72.8 | 71.5 | 69 | 74.7 |
| Strain pt. (° C.) | 606 | 605 | 604 | 605 | 587 | 589 | 578 |
| Anneal pt. (° C.) | 661 | 662 | 661 | 661 | 642 | 644 | 631 |
| Softening pt. (° C.) | 926.4 | 931.7 | 930.3 | 935.1 | 908.6 | 912.3 | 898.4 |
| Liquidus temperature (° C.) | 1080 | 1095 | 1090 | 1095 | 1080 | 1100 | 1055 |
| Liquidus viscosity (P) | 602823 | 482764 | 539563 | 515222 | 386294 | 264159 | 520335 |
| Stress optical coefficient (nm/mm/MPa) | 30.04 | 30.43 | 30.43 | 30.4 | 30.51 | 3.083 | 30.34 |
| Refractive index at 589.3 nm | 1.5016 | 1.5003 | 1.5003 | 1.5010 | 1.5037 | 1.5021 | 1.5035 |
| Young's modulus (GPa) | 75.84 | 75.57 | 75.70 | 75.15 | 76.67 | 75.77 | 76.12 |

| | Ex. 58 | Ex. 59 | Ex. 60 |
|---|---|---|---|
| Fulchers A | −3.649 | −3.231 | −2.918 |
| Fulchers B | 9623.9 | 8275.1 | 7331.7 |
| Fulchers To | 33.9 | 126.8 | 188.3 |
| 200 P Temperature (° C.) | 1651 | 1623 | 1593 |
| 35000 P Temperature (° C.) | 1209 | 1191 | 1171 |
| 200000 P Temperature (° C.) | 1109 | 1097 | 1080 |
| Density (g/cm$^3$) | 2.408 | 2.401 | 2.394 |
| CTE 25-300° C. (ppm/° C.) | 71.7 | 74.5 | 70.4 |
| Strain pt. (° C.) | 579 | 607 | 607 |
| Anneal pt. (° C.) | 633 | 656 | 656 |
| Softening pt. (° C.) | 898.7 | 900.7 | 900 |
| Liquidus temperature (° C.) | 1090 | 1180 | 1265 |
| Liquidus viscosity (P) | 290856 | 42277 | 7788 |
| Stress optical coefficient (nm/mm/MPa) | 3.028 | 2.937 | 2.926 |
| Refractive index at 589.3 nm | 1.5022 | 1.5071 | 1.5099 |
| Young's modulus (GPa) | 75.84 | 78.60 | 79.91 |

Examples 58-65 were formed into glass articles (having a sheet form and specific thickness) and then chemically strengthened by immersing in a molten salt bath having a specific temperature, for a specified duration. Table 8 shows the thickness of each glass article, the chemical strengthening conditions, and the measured maximum CT and DOC values of the resulting strengthened glass article.

TABLE 8

Chemical strengthening conditions and resulting attributes of selected strengthened alkali aluminosilicate glass articles.

| | Ex. 58 | Ex. 59 | Ex. 60 | Ex. 61 |
|---|---|---|---|---|
| Immersion in a molten salt bath of 100% NaNO₃ having a temperature of 390° C. for 4 hours | | | | |
| Thickness (mm) | 1.07 | 1.11 | 1.11 | 1.05 |
| Maximum CT (MPa) | 81 | 76 | 72 | 74 |
| DOC as a fraction of thickness | 0.19 | 0.19 | 0.19 | 0.17 |
| Immersion in a molten salt bath of 100% NaNO₃ having a temperature of 390° C. for 6 hours | | | | |
| Thickness (mm) | 1.08 | 1.1 | 1.12 | 1.04 |
| Maximum CT (MPa) | 89 | 80 | 87 | 86 |
| DOC as a fraction of thickness | 0.18 | 0.2 | 0.19 | 0.19 |
| Immersion in a molten salt bath of 100% NaNO₃ having a temperature of 390° C. for 8 hours | | | | |
| Thickness (mm) | 1.07 | 1.1 | 1.11 | 1.03 |
| Maximum CT (MPa) | 88 | 83 | 84 | 87 |
| DOC as a fraction of thickness | 0.19 | 0.2 | 0.2 | 0.17 |
| | Ex. 62 | Ex. 63 | Ex. 64 | Ex. 65 |
| Immersion in a molten salt bath of 100% NaNO₃ having a temperature of 390° C. for 4 hours | | | | |
| Thickness (mm) | 1.05 | 1.02 | 1.09 | 1.09 |
| Maximum CT (MPa) | 81 | 82 | 77 | 73 |
| DOC as a fraction of thickness | 0.17 | 0.16 | 0.17 | 0.18 |
| Immersion in a molten salt bath of 100% NaNO₃ having a temperature of 390° C. for 6 hours | | | | |
| Thickness (mm) | 1.08 | 1.03 | 1.07 | 1.1 |
| Maximum CT (MPa) | 81 | 82 | 85 | 85 |
| DOC as a fraction of thickness | 0.2 | 0.2 | 0.19 | 0.2 |
| Immersion in a molten salt bath of 100% NaNO₃ having a temperature of 390° C. for 8 hours | | | | |
| Thickness (mm) | 1.06 | 1.04 | 1.09 | 1.1 |
| Maximum CT (MPa) | 84 | 87 | 84 | 83 |
| DOC as a fraction of thickness | 0.18 | 0.18 | 0.2 | 0.19 |

Figure 2:
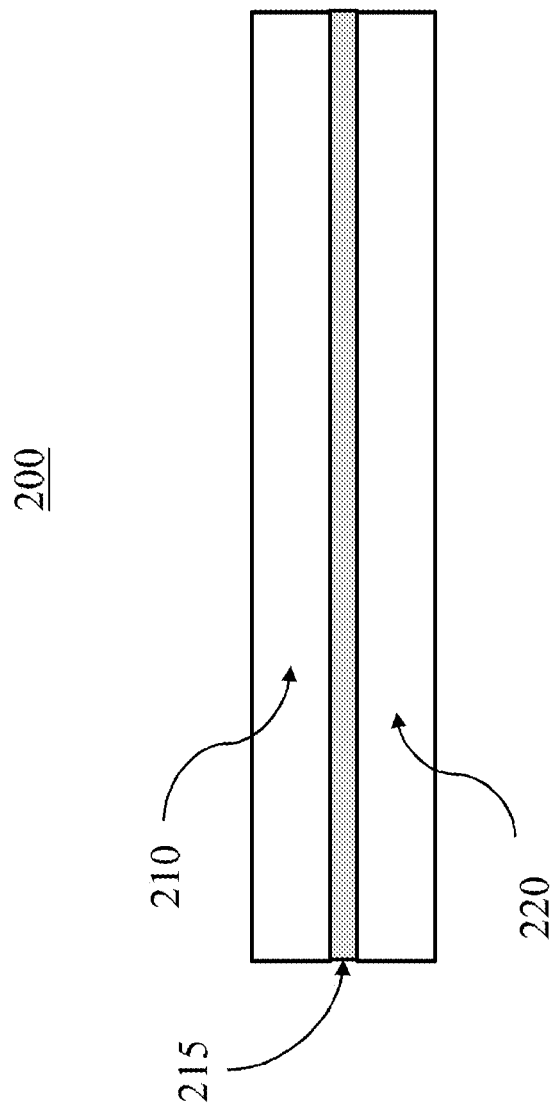
FIG. 2 is a schematic cross sectional view of a laminate comprising one or more embodiments of the alkali aluminosilicate glass articles described herein.

In another aspect, a laminate comprising the alkali aluminosilicate glasses described herein is also provided. A schematic cross-sectional view of the laminate is shown in FIG. 2. The laminate 200 comprises an alkali aluminosilicate glass article 200 (which may be provided as a sheet) and a second article 220 (which may also be provided as a sheet). As shown in FIG. 2, the sheet of alkali aluminosilicate glass article may be joined to the transparent substrate 220.

In one or more embodiments, the second article 220 has a refractive index that is within 5% of the refractive index of the alkali aluminosilicate glass sheet 210. By closely matching the refractive indices of the second article 220 and the alkali aluminosilicate glass sheet 210, the laminate 200 is transparent and exhibits little haze (e.g., less than about 20% or, in some embodiments, less than 10% at a viewing angle of 90° to the surface). The second article 220 may comprise a second sheet of the alkali aluminosilicate glass used in sheet 210, and may have a thickness and/or composition that differs from those of sheet 210. In some embodiments, the second article 220 includes a sheet of soda lime glass, or borosilicate glass. Alternatively, a plastic material such as polycarbonate or the like may serve as the second article 220 so long as the previously mentioned criteria for optical quality are met.

In one embodiment, the alkali aluminosilicate glass sheet 210 is joined to the second article 220 by a bonding layer 215. The bonding layer 215 is also transparent and may comprise those bonding agents or materials, such as adhesives, epoxies, resins, frit materials or the like that are known in the art to be suitable for such purposes and have the desired optical properties. In one embodiment, the bonding layer 215 has a refractive index that is within 5% of the refractive index of the alkali aluminosilicate glass sheet 210 and the second article 220, in order to provide high optical quality with little haze and/or distortion. Alternatively, the alkali aluminosilicate glass sheet 210 and second article 220 may be bonded directly to each other by way of fusion. In one such embodiment, the alkali aluminosilicate glass sheet 210 and second article 220 may be simultaneously fusion drawn such that the surfaces of the two fusion drawn sheets contact each other and thus bond together to form the laminate.

Figure 3:
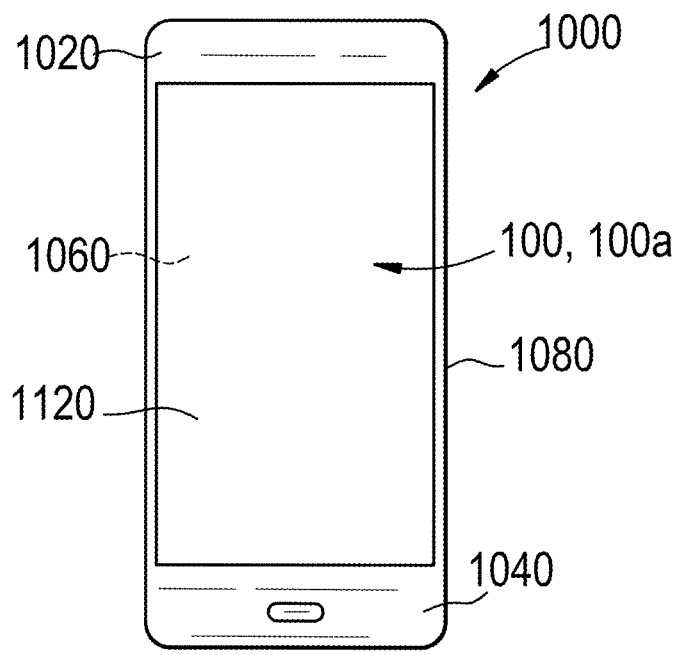
FIG. 3 is schematic, front plan view of a consumer electronic product including one or more embodiments of the alkali aluminosilicate glass articles described herein.
Figure 4:
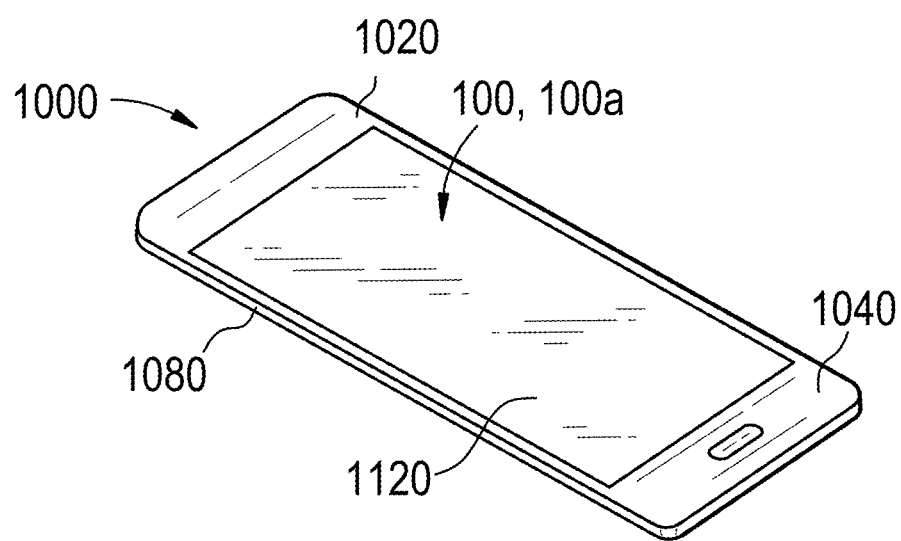
FIG. 4 is a schematic, prospective view of the consumer electronic product of FIG. 3.

In some embodiments, the alkali aluminosilicate glass articles and laminates described herein form a portion of a consumer electronic product, such as a cellular phone or smart phone, laptop computers, tablets, or the like. A schematic view of a consumer electronic product (e.g., a smart phone) is shown in FIGS. 3 and 4. Consumer electronic product 1000 typically comprises a housing 1020 having a front surface 1040, a back surface 1060, and side surfaces 1080; and includes electrical components (not shown), which are at least partially internal to the housing 1020. The electrical components include at least a power source, a controller, a memory, and a display 1120. The display 1120 is, in some embodiments, provided at or adjacent the front surface 312 of the housing. A cover glass 100, 100a, which comprises an embodiment of the strengthened alkali aluminosilicate glass articles described herein, is provided at or over the front surface 1040 of the housing 1020 such that the cover glass 100, 100a is positioned over the display 1120 and protects the display 1120 from damage caused by impact or damage. The cover glass 100 has a thickness of from about 0.4 mm to about 2.5 mm and, when chemically strengthened, a maximum compressive stress of at least 400 MPa at the surface of the cover glass 100. In some embodiments, the cover glass has a thickness of at least 1 mm and has a maximum compressive stress at the surface of at least 1050 MPa and a depth of layer of up to about 25 μm. In other embodiments, the cover glass has a thickness of at least 1 mm and has a maximum compressive stress at the surface of at least about 930 MPa and a depth of layer of at least about 40 μm.

Aspect (1) of this disclosure pertains to an alkali aluminosilicate glass article comprising: a compressive stress layer extending from a surface of the alkali aluminosilicate glass to a depth of layer (DOL), the compressive stress layer having a maximum compressive stress of at least 400 MPa at the surface, wherein the alkali aluminosilicate glass article comprises at least about 58 mol % $SiO_2$, from about 0.5 mol % to about 3 mol % $P_2O_5$, at least about 11 mol % $Al_2O_3$, $Na_2O$ and $Li_2O$, wherein the ratio of the amount of $Li_2O$ (mol %) to Na$_2$O (mol %) (Li$_2$O/Na$_2$O) is less than 1.0, and wherein the alkali aluminosilicate glass article is free of B$_2$O$_3$.

Aspect (2) of this disclosure pertains to the alkali aluminosilicate glass article according to Aspect (1), wherein the alkali aluminosilicate glass article comprises a fictive temperature T$_f$ that is equal to a temperature at which the alkali aluminosilicate glass article has a viscosity of 10$^{11}$ Poise.

Aspect (3) of this disclosure pertains to the alkali aluminosilicate glass article according to Aspect (1) or Aspect (2), wherein the alkali aluminosilicate glass article comprises a zircon breakdown temperature of less than about 35 kPoise.

Aspect (4) of this disclosure pertains to the alkali aluminosilicate glass article according to any one of Aspects (1) through (3), wherein the alkali aluminosilicate glass article comprises a liquidus viscosity of at least 200 kPoise.

Aspect (5) of this disclosure pertains to the alkali aluminosilicate glass article according to any one of Aspects (1) through (4), wherein the alkali aluminosilicate glass article comprises a ratio R$_2$O (mol %)/Al$_2$O$_3$ (mol %) that is less than 2, where R$_2$O=Li$_2$O+Na$_2$O.

Aspect (6) of this disclosure pertains to the alkali aluminosilicate glass article according to any one of Aspects (1) through (5), wherein the alkali aluminosilicate glass article comprises a total amount of SiO$_2$ and P$_2$O$_5$ that is greater than 65 mol % and less than 67 mol % (65 mol %<SiO$_2$ (mol %)+P$_2$O$_5$ (mol %)<67 mol %).

Aspect (7) of this disclosure pertains to the alkali aluminosilicate glass article according to any one of Aspects (1) through (6), wherein the alkali aluminosilicate glass article comprises a relationship R$_2$O (mol %)+R'O (mol %)−Al$_2$O$_3$ (mol %)+P$_2$O$_5$ (mol %) that is greater than about −3 mol %, wherein R$_2$O=the total amount of Li$_2$O and Na$_2$O present in the alkali aluminosilicate glass article and R'O is a total amount of divalent metal oxides present in the alkali aluminosilicate glass article.

Aspect (8) of this disclosure pertains to the alkali aluminosilicate glass article according to any one of Aspects (1) through (7), wherein the alkali aluminosilicate glass article comprises from about 58 mol % to about 65 mol % SiO$_2$; from about 11 mol % to about 20 mol % Al$_2$O$_3$; from about 6 mol % to about 18 mol % Na$_2$O; from 0 mol % to about 6 mol % MgO; and from 0 mol % to about 6 mol % ZnO.

Aspect (9) of this disclosure pertains to the alkali aluminosilicate glass article according to any one of Aspects (1) through (8), wherein the alkali aluminosilicate glass article comprises P$_2$O$_5$ in an amount in a range from about 0.5 mol % to about 2.8 mol %.

Aspect (10) of this disclosure pertains to the alkali aluminosilicate glass article according to any one of Aspects (1) through (9), wherein the alkali aluminosilicate glass article comprises Li$_2$O in an amount up to about 10 mol % Li$_2$O.

Aspect (11) of this disclosure pertains to the alkali aluminosilicate glass article according to any one of Aspects (1) through (10), wherein the article comprises a thickness in a range from about 0.05 mm to about 1.5 mm.

Aspect (12) of this disclosure pertains to the alkali aluminosilicate glass article according to any one of Aspects (1) through (11), wherein the glass article comprises a thickness of at least 1 mm, and wherein the maximum compressive stress is at least about 1050 MPa at the surface.

Aspect (13) of this disclosure pertains to the alkali aluminosilicate glass article according to any one of Aspects (1) through (12), wherein the glass article comprises a thickness of at least 1 mm, and wherein the maximum compressive stress is at least about 930 MPa at the surface.

Aspect (14) of this disclosure pertains to the alkali aluminosilicate glass article according to any one of Aspects (1) through (13), wherein the glass is chemically strengthened.

Aspect (15) of this disclosure pertains to the alkali aluminosilicate glass article according to any one of Aspects (1) through (14), wherein the article comprises a thickness and a central region extending from the DOL to a depth equal to 0.5 times the thickness, and wherein the central region is free of K$_2$O.

Aspect (16) of this disclosure pertains to the alkali aluminosilicate glass article according to any one of Aspects (1) through (15), wherein the glass has a bend radius of less than about 37 mm at a thickness of about 1 mm.

Aspect (17) of this disclosure pertains to the alkali aluminosilicate glass article according Aspect (16), wherein the bend radius is less than about 35 mm.

Aspect (18) of this disclosure pertains to the alkali aluminosilicate glass article according to any one of Aspects (1) through (17), wherein the alkali aluminosilicate glass has a tensile region extending from the depth of layer into the glass article, wherein the tensile region has a maximum tensile stress of less than about 20 MPa or greater than about 40 MPa.

Aspect (19) of this disclosure pertains to a laminate comprising the alkali aluminosilicate glass article according to any one of Aspects (1) through (18), and a second article.

Aspect (20) of this disclosure pertains to a consumer electronic device comprising: a housing; electrical components provided at least partially internal to the housing, the electrical components including at least a controller, a memory, and a display, the display being provided at or adjacent to a front surface of the housing; and a cover article disposed at or over the front surface of the housing and over the display, wherein the cover article comprises the alkali aluminosilicate glass article according to any one of Aspects (1) through (19).

Aspect (21) of this disclosure pertains to an alkali aluminosilicate glass article comprising: a thickness t, a compressive stress layer extending from a surface of the alkali aluminosilicate glass to a depth of layer (DOL), and a central region comprising a maximum tensile stress, wherein the central region extends from the DOL, and wherein the alkali aluminosilicate glass is free of B$_2$O$_3$ and comprises at least about 58 mol % SiO$_2$, from about 0.5 mol % to about 3 mol % P$_2$O$_5$, at least about 11 mol % Al$_2$O$_3$, Na$_2$O and, Li$_2$O, wherein the ratio of the amount of Li$_2$O (mol %) to Na$_2$O (mol %) (Li$_2$O/Na$_2$O) is less than 1.0, wherein the DOL is less than or equal to 0.25*t, and wherein the maximum tensile stress is about 35 MPa or greater.

Aspect (22) of this disclosure pertains to the alkali aluminosilicate glass article according to Aspect (21), wherein the glass article further comprises a tensile stress profile in the central region, wherein the tensile stress profile is substantially parabolic.

Aspect (23) of this disclosure pertains to the alkali aluminosilicate glass article according to any one of Aspects (21) through (22), wherein the alkali aluminosilicate glass article comprises a fictive temperature T$_f$ that is equal to a temperature at which the alkali aluminosilicate glass article has a viscosity of 10$^{11}$ Poise.

Aspect (24) of this disclosure pertains to the alkali aluminosilicate glass article according to any one of Aspects (21) through (23), wherein the alkali aluminosilicate glass article comprises a zircon breakdown temperature of less than about 35 kPoise.

Aspect (25) of this disclosure pertains to the alkali aluminosilicate glass article according to any one of Aspects

(21) through (24), wherein the alkali aluminosilicate glass article comprises a liquidus viscosity of at least 200 kPoise.

Aspect (26) of this disclosure pertains to the alkali aluminosilicate glass article according to any one of Aspects (21) through (25), wherein the alkali aluminosilicate glass article comprises a ratio $R_2O$ (mol %)/$Al_2O_3$ (mol %) that is less than 2, where $R_2O=Li_2O+Na_2O$.

Aspect (27) of this disclosure pertains to the alkali aluminosilicate glass article according to any one of Aspects (21) through (26), wherein the alkali aluminosilicate glass article comprises a total amount of $SiO_2$ and $P_2O_5$ that is greater than 65 mol % and less than 67 mol % (65 mol %<$SiO_2$ (mol %)+$P_2O_5$ (mol %)<67 mol %).

Aspect (28) of this disclosure pertains to the alkali aluminosilicate glass article according to any one of Aspects (21) through (27), wherein the alkali aluminosilicate glass article comprises a relationship $R_2O$ (mol %)+R'O (mol %)−$Al_2O_3$ (mol %)+$P_2O_5$ (mol %) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article.

Aspect (29) of this disclosure pertains to the alkali aluminosilicate glass article according to any one of Aspects (21) through (28), wherein the alkali aluminosilicate glass article comprises from about 58 mol % to about 65 mol % $SiO_2$; from about 11 mol % to about 20 mol % $Al_2O_3$; from about 6 mol % to about 18 mol % $Na_2O$; from 0 mol % to about 6 mol % MgO; and from 0 mol % to about 6 mol % ZnO.

Aspect (30) of this disclosure pertains to the alkali aluminosilicate glass article according to any one of Aspects (21) through (29), wherein the alkali aluminosilicate glass article comprises $P_2O_5$ in an amount in a range from about 0.5 mol % to about 2.8 mol %.

Aspect (31) of this disclosure pertains to the alkali aluminosilicate glass article according to any one of Aspects (21) through (30), wherein the alkali aluminosilicate glass article comprises $Li_2O$ in an amount up to about 10 mol % $Li_2O$.

Aspect (32) of this disclosure pertains to the alkali aluminosilicate glass article according to any one of Aspects (21) through (31), wherein the alkali aluminosilicate glass article is free of $K_2O$.

Aspect (33) pertains to a device comprising: a housing having front, back, and side surfaces; electrical components that are at least partially inside the housing; a display at or adjacent to the front surface of the housing; and a strengthened alkali aluminosilicate glass article disposed over the display, wherein the strengthened alkali aluminosilicate glass article comprises a compressive stress layer extending from a surface of the alkali aluminosilicate glass article to a depth of layer (DOL), the compressive layer having a maximum compressive stress of at least 400 MPa at the surface, wherein the alkali aluminosilicate article comprises at least about 58 mol % $SiO_2$, from about 0.5 mol % to about 3 mol % $P_2O_5$, at least about 11 mol % $Al_2O_3$, $Na_2O$ and $Li_2O$, wherein the ratio of the amount of $Li_2O$ (mol %) to $Na_2O$ (mol %) ($Li_2O/Na_2O$) is less than 1.0, and wherein the alkali aluminosilicate glass article is free of $B_2O_3$.

Aspect (34) pertains to the device of Aspect (33), wherein the alkali aluminosilicate glass article comprises a fictive temperature $T_f$ that is equal to a temperature at which the alkali aluminosilicate glass article has a viscosity of $10^{11}$ Poise.

Aspect (35) pertains to the device of any one of Aspects (33) through (34), wherein the alkali aluminosilicate glass article comprises a zircon breakdown temperature of less than about 35 kPoise.

Aspect (36) pertains to the device of any one of Aspects (33) through (35), wherein alkali aluminosilicate glass article comprises a liquidus viscosity of at least 200 kPoise.

Aspect (37) pertains to the device of any one of Aspects (33) through (36), wherein the alkali aluminosilicate glass article comprises a ratio $R_2O$ (mol %)/$Al_2O_3$ (mol %) that is less than 2, where $R_2O=Li_2O+Na_2O$.

Aspect (38) pertains to the device of any one of Aspects (33) through (37), wherein the alkali aluminosilicate glass article comprises a total amount of $SiO_2$ and $P_2O_5$ that is greater than 65 mol % and less than 67 mol % (65 mol %<$SiO_2$ (mol %)+$P_2O_5$ (mol %)<67 mol %).

Aspect (39) pertains to the device of any one of Aspects (33) through (38), wherein the alkali aluminosilicate glass article comprises a relationship $R_2O$ (mol %)+R'O (mol %)−$Al_2O_3$ (mol %)+$P_2O_5$ (mol %) that is greater than about −3 mol %, wherein $R_2O$=the total amount of $Li_2O$ and $Na_2O$ present in the alkali aluminosilicate glass article and WO is a total amount of divalent metal oxides present in the alkali aluminosilicate glass article.

Aspect (40) pertains to the device of any one of Aspects (33) through (39), wherein the alkali aluminosilicate glass article comprises from about 58 mol % to about 65 mol % $SiO_2$; from about 11 mol % to about 20 mol % $Al_2O_3$; from about 6 mol % to about 18 mol % $Na_2O$; from 0 mol % to about 6 mol % MgO; and from 0 mol % to about 6 mol % ZnO.

Aspect (41) pertains to the device of any one of Aspects (33) through (40), wherein the alkali aluminosilicate glass article comprises $P_2O_5$ in an amount in a range from about 0.5 mol % to about 2.8 mol %.

Aspect (42) pertains to the device of any one of Aspects (33) through (41), wherein the alkali aluminosilicate glass article comprises $Li_2O$ in an amount up to about 10 mol % $Li_2O$.

Aspect (43) pertains to the device of any one of Aspects (33) through (42), wherein the alkali aluminosilicate glass has a thickness in a range from about 0.05 mm to about 1.5 mm.

Aspect (44) pertains to the device of any one of Aspects (33) through (43), wherein the glass article further comprises a thickness of at least 1 mm, wherein the maximum compressive stress is at least about 1050 MPa at the surface.

Aspect (45) pertains to the device of any one of Aspects (33) through (44), wherein the glass article further comprises a thickness of at least 1 mm, wherein the maximum compressive stress is at least about 930 MPa at the surface.

Aspect (46) pertains to the device of any one of Aspects (33) through (45), wherein the depth of layer is at least 40 μm.

Aspect (47) pertains to the device of any one of Aspects (33) through (46), wherein the alkali aluminosilicate glass is chemically strengthened.

Aspect (48) pertains to the device of any one of Aspects (33) through (47), wherein the glass article further comprises a thickness and a central region extending from the DOL to a depth equal to 0.5 times the thickness, and wherein the central region is free of $K_2O$.

Aspect (49) pertains to the device of any one of Aspects (33) through (48), wherein the device comprises a mobile electronic communication and entertainment device selected from the group consisting of a mobile phone, a smart phone, a tablet, a video player, an information terminal (IT) device, a music player, and a laptop computer.

Aspect (50) pertains an alkali aluminosilicate glass article comprising: at least about 58 mol % $SiO_2$, from about 0.5 mol % to about 3 mol % $P_2O_5$, at least about 11 mol % $Al_2O_3$, $Na_2O$ and $Li_2O$, wherein the alkali aluminosilicate glass article is free of $B_2O_3$ and $K_2O$, and wherein the ratio of the amount of $Li_2O$ (mol %) to $Na_2O$ (mol %) ($Li_2O/Na_2O$) is less than 1.0.

Aspect (51) pertains to the alkali aluminosilicate glass article of Aspect (50) wherein the alkali aluminosilicate glass article comprises $P_2O_5$ in an amount in a range from about 0.5 mol % to about 2.8 mol %.

Aspect (52) pertains to the alkali aluminosilicate glass article of any one of Aspects (50) through (51), wherein the alkali aluminosilicate glass article comprises $Li_2O$ in an amount up to about 10 mol % $Li_2O$.

Aspect (53) pertains to the alkali aluminosilicate glass article of any one of Aspects (50) through (52), wherein the alkali aluminosilicate glass article comprises a fictive temperature $T_f$ that is equal to a temperature at which the alkali aluminosilicate glass has a viscosity of $10^{11}$ Poise.

Aspect (54) pertains to the alkali aluminosilicate glass article of any one of Aspects (50) through (53), wherein the alkali aluminosilicate glass article comprises a zircon breakdown temperature of less than about 35 kPoise.

Aspect (55) pertains to the alkali aluminosilicate glass article of any one of Aspects (50) through (54), wherein the alkali aluminosilicate glass article comprises a liquidus viscosity of at least 200 kPoise.

Aspect (56) pertains to the alkali aluminosilicate glass article of any one of Aspects (50) through (55), wherein the alkali aluminosilicate glass article comprises a ratio $R_2O$ (mol %)/$Al_2O_3$ (mol %) that is less than 2, where $R_2O=Li_2O+Na_2O$.

Aspect (57) pertains to the alkali aluminosilicate glass article of any one of Aspects (50) through (56), wherein the alkali aluminosilicate glass article comprises a total amount of $SiO_2$ and $P_2O_5$ that is greater than 65 mol % and less than 67 mol % (65 mol %<$SiO_2$ (mol %)+$P_2O_5$ (mol %)<67 mol %).

Aspect (58) pertains to the alkali aluminosilicate glass article of any one of Aspects (50) through (57), wherein the alkali aluminosilicate glass article comprises a relationship $R_2O$ (mol %)+R'O (mol %)−$Al_2O_3$ (mol %)+$P_2O_5$ (mol %) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article.

Aspect (59) pertains to the alkali aluminosilicate glass article of any one of Aspects (50) through (58), wherein the alkali aluminosilicate glass article comprises from about 58 mol % to about 65 mol % $SiO_2$; from about 11 mol % to about 20 mol % $Al_2O_3$; from about 6 mol % to about 18 mol % $Na_2O$; from 0 mol % to about 6 mol % MgO; and from 0 mol % to about 6 mol % ZnO.

Aspect (60) pertains to a laminate comprising the alkali aluminosilicate glass article of any one of Aspects (50) through (59), and a second article.

Aspect (61) pertains to a device comprising: a housing having front, back, and side surfaces; electrical components that are at least partially inside the housing; a display at or adjacent to the front surface of the housing; and the alkali aluminosilicate glass article of any one of Aspects (50) through (60).

Aspect (62) pertains to a method of making a strengthened alkali aluminosilicate glass, the alkali aluminosilicate glass having a compressive stress layer, the method comprising: generating a compressive stress in an alkali aluminosilicate glass article by ion exchanging the aluminosilicate glass article, wherein the alkali aluminosilicate is free of $B_2O_3$ and $K_2O$ and comprises at least about 58 mol % $SiO_2$, from about 0.5 mol % to about 3 mol % $P_2O_5$, at least about 11 mol % $Al_2O_3$, $Na_2O$ and, $Li_2O$, wherein the ratio of the amount of $Li_2O$ (mol %) to $Na_2O$ (mol %) ($Li_2O/Na_2O$) is less than 1.0, wherein the compressive stress layer extends from a surface of the alkali aluminosilicate glass to a depth of layer, and wherein the compressive layer comprises a maximum compressive stress of at least about 400 MPa at the surface.

Aspect (63) pertains to the method according to Aspect (62), wherein the maximum compressive stress is at least 800 MPa.

Aspect (64) pertains to the method according to any one of Aspects (62) through (63), wherein the depth of layer comprises at least about 40 µm.

Aspect (65) pertains to the method according to any one of Aspects (62) through (64), wherein the maximum compressive stress is at least 1050 MPa.

Aspect (66) pertains to the method according to any one of Aspects (62) through (65), wherein ion exchanging the alkali aluminosilicate glass comprises immersing the alkali aluminosilicate glass in a molten salt bath.

Aspect (67) pertains to the method according to Aspect (66), wherein the molten salt bath comprises $NaNO_3$.

Aspect (68) pertains to the method according to Aspect (66), wherein the molten salt bath comprises $KNO_3$.

Aspect (69) pertains to the method according to Aspect (66), wherein the molten salt bath comprises $NaNO_3$ and $KNO_3$.

Aspect (70) pertains to the method according to any one of Aspects (62) through (69), wherein the alkali aluminosilicate glass article has a thickness in a range from about 0.05 mm to about 1.5 mm.

Aspect (71) pertains to the method according to any one of Aspects (62) through (70), further comprising joining the ion exchanged alkali aluminosilicate glass to a substrate to form a laminate structure.

Aspect (72) pertains to the method according to any one of Aspects (62) through (70), further comprising joining the ion exchanged alkali aluminosilicate glass to an electronic device housing.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:
1. An alkali aluminosilicate glass article comprising: a compressive stress layer extending from a surface of the alkali aluminosilicate glass to a depth of layer (DOL), the compressive stress layer having a maximum compressive stress of at least 400 MPa at the surface, wherein the alkali aluminosilicate glass article comprises:
   from about 58 mol % to about 65 mol % $SiO_2$;
   from about 0.5 mol % to about 3 mol % $P_2O_5$;
   at least 11 mol % $Al_2O_3$;
   $Na_2O$; and
   from 4 mol % up to about 13 mol % $Li_2O$, wherein the ratio of the amount of $Li_2O$(mol %) to $Na_2O$ (mol %) $Li_2O/Na_2O$) is less than 1.0, wherein the alkali aluminosilicate glass article is free of $B_2O_3$, and wherein the alkali aluminosilicate glass article comprises a liquidus viscosity of at least 200 kPoise.

2. The alkali aluminosilicate glass article of claim 1, wherein the alkali aluminosilicate glass article comprises a fictive temperature $T_f$ that is equal to a temperature at which the alkali aluminosilicate glass article has a viscosity of $10^{11}$ Poise.

3. The alkali aluminosilicate glass article of claim 1, wherein the alkali aluminosilicate glass article comprises a zircon breakdown viscosity of less than about 35 kPoise.

4. The alkali aluminosilicate glass article of claim 1, wherein the alkali aluminosilicate glass article comprises a ratio $R_2O$ (mol %)/$Al_2O_3$ (mol %) that is less than 2, where $R_2O=Li^2O+Na_2O$.

5. The alkali aluminosilicate glass article of claim 1, wherein the alkali aluminosilicate glass article comprises a total amount of $SiO_2$ and $P_2O_5$ that is greater than 65 mol % and less than 67 mol % (65 mol % <$SiO_2$ (mol %)+$P_2O_5$ (mol %)<67 mol %).

6. The alkali aluminosilicate glass article of claim 1, wherein the alkali aluminosilicate glass article comprises a relationship $R_2O$(mol %)+R'O(mol %)−$Al_2O_3$ (mol %)+$P_2O_5$(mol %)) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article.

7. The alkali aluminosilicate glass article of claim 1, wherein the alkali aluminosilicate glass article comprises from 12 mol % to about 20 mol % $Al_2O_3$; from about 6 mol % to about 18 mol % $Na_2O$; from 4 mol % to about 8 mol % $Li_2O$; from 0 mol % to about 6 mol % MgO; and from 0 mol % to about 6 mol % ZnO.

8. The alkali aluminosilicate glass article of claim 1, wherein the alkali aluminosilicate glass article comprises $P_2O_5$ in an amount in a range from about 0.5 mol % to about 2.8 mol %.

9. The alkali aluminosilicate glass article of claim 1, further comprising a thickness in a range from about 0.05 mm to about 1.5 mm.

10. The alkali aluminosilicate glass article of claim 1, further comprising a thickness of at least 1 mm, wherein the maximum compressive stress is at least about 1050 MPa at the surface.

11. The alkali aluminosilicate glass article of claim 1, further comprising a thickness of at least 1 mm, wherein the maximum compressive stress is at least about 930 MPa at the surface.

12. The alkali aluminosilicate glass article of claim 1, wherein the glass is chemically strengthened.

13. The alkali aluminosilicate glass article of claim 1, further comprising a thickness and a central region extending from the DOL to a depth equal to 0.5 times the thickness, and wherein the central region is free of $K_2O$.

14. The alkali aluminosilicate glass article of claim 1, comprising from 4 mol % up to about 10 mol % $Li_2O$.

15. The alkali aluminosilicate glass article of claim 1, wherein the DOL is greater than or equal to 40 μm.

16. A consumer electronic device comprising: a housing; electrical components provided at least partially internal to the housing, the electrical components including at least a controller, a memory, and a display, the display being provided at or adjacent to a front surface of the housing; and a cover article disposed at or over the front surface of the housing and over the display, wherein the cover article comprises the alkali aluminosilicate glass article of claim 1.

17. An alkali aluminosilicate glass article comprising: a thickness t, a compressive stress layer extending from a surface of the alkali aluminosilicate glass to a depth of layer (DOL), and a central region comprising a maximum tensile stress, wherein the central region extends from the DOL, and wherein the alkali aluminosilicate glass is free of $B_2O_3$ and comprises:

from about 58 mol % $SiO_2$ to about 65 mol % $SiO_2$;

from about 0.5 mol % to about 3 mol % $P_2O_5$;

at least 11 mol % $Al_2O_3$;

$Na_2O$; and from 4 mol % up to about 13 mol % $Li_2O$, wherein the ratio of the amount of $Li_2O$ (mol %) to $Na_2O$ (mol %) ($Li_2O/Na_2O$) is less than 1.0, wherein the DOL is less than or equal to 0.25*t, wherein the maximum tensile stress is about 35 MPa or greater, and wherein the alkali aluminosilicate glass article comprises a liquidus viscosity of at least 200 kPoise.

18. The alkali aluminosilicate glass article of claim 17, wherein the alkali aluminosilicate glass article comprises a fictive temperature $T_f$ that is equal to a temperature at which the alkali aluminosilicate glass article has a viscosity of $10^{11}$ Poise.

19. The alkali aluminosilicate glass of claim 17, wherein the alkali aluminosilicate glass article comprises a zircon breakdown viscosity of less than about 35 kPoise.

20. The alkali aluminosilicate glass of claim 17, wherein the alkali aluminosilicate glass article comprises a ratio $R_2O$ (mol %)/$Al_2O_3$(mol %) that is less than 2, where $R_2O=Li_2O+Na_2O$.

21. The alkali aluminosilicate glass claim 17, wherein the alkali aluminosilicate glass article comprises a total amount of $SiO_2$ and $P_2O_5$ that is greater than 65 mol % and less than 67 mol % (65 mol % <$SiO_2$ (mol %)+$P_2O_5$ (mol %)<67 mol %).

22. The alkali aluminosilicate glass of claim 17, wherein the alkali aluminosilicate glass article comprises a relationship $R_2O$ (mol %)+R'O(mol %) −$Al_2O_3$ (mol %)+$P_2O_5$ (mol %)) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article.

23. The alkali aluminosilicate glass of claim 17, wherein the alkali aluminosilicate glass article comprises from 12 mol % to about 20 mol % $Al_2O_3$; from about 6 mol % to about 18 mol % $Na_2O$; from 4 mol % to about 8 mol % $Li_2O$; from 0 mol % to about 6 mol % MgO; and from 0 mol % to about 6 mol % ZnO.

24. The alkali aluminosilicate glass article of claim 17, wherein the DOL is greater than or equal to 40 μm.

25. A device comprising:

a housing having front, back, and side surfaces;

electrical components that are at least partially inside the housing; a display at or adjacent to the front surface of the housing; and a strengthened alkali aluminosilicate glass article disposed over the display, wherein the strengthened alkali aluminosilicate glass article comprises a compressive stress layer extending from a surface of the alkali aluminosilicate glass article to a depth of layer (DOL), the compressive layer having a maximum compressive stress of at least 400 MPa at the surface, wherein the alkali aluminosilicate article comprises:
from about 58 mol % $SiO_2$ to about 65 mol % $SiO_2$;
from about 0.5 mol % to about 3 mol % $P_2O_5$;
at least 11 mol % $Al_2O_3$;
$Na_2O$; and
from 4 mol % up to about 13 mol % $Li_2O$, wherein the ratio of the amount of $Li_2O$(mol %) to $Na_2O$ (mol %) $Li_2O/Na_2O$) is less than 1.0,
wherein the alkali aluminosilicate glass article is free of $B_2O_3$, and
wherein the alkali aluminosilicate glass article comprises a liquidus viscosity of at least 200 kPoise.

26. The device of claim 25, wherein the device comprises a mobile electronic communication and entertainment device selected from the group consisting of a mobile phone, a smart phone, a tablet, a video player, an information terminal (IT) device, a music player, and a laptop computer.

27. The alkali aluminosilicate glass article of claim 25, comprising from 4 mol % up to about 10 mol % $Li_2O$.

28. The alkali aluminosilicate glass article of claim 25, wherein the DOL is greater than or equal to 40 μm.

29. An alkali aluminosilicate glass article comprising: at from about 58 mol % $SiO_2$ to about 65 mol % $SiO_2$, from about 0.5 mol % to about 3 mol % $P_2O_5$, at least 12 mol % $Al_2O_3$, from 4 mol % to about 8 mol % $Li_2O$, and $Na_2O$, wherein the alkali aluminosilicate glass article is free of $B_2O_3$ and $K_2O$, and wherein the ratio of the amount of $Li_2O$(mol %) to $Na_2O$ (mol %) $Li_2O/Na_2O$) is less than 1.0, wherein the alkali aluminosilicate glass article comprises a liquidus viscosity of at least 200 kPoise.

30. The alkali aluminosilicate glass article of claim 29, wherein the alkali aluminosilicate glass article comprises $P_2O_5$ in an amount in a range from about 0.5 mol % to about 2.8 mol %.

31. The alkali aluminosilicate glass article of claim 29, wherein the alkali aluminosilicate glass article comprises any one of
a ratio $R_2O$ (mol %)/$Al_2O_3$(mol %) that is less than 2, where $R_2O=Li_2O+Na_2O$;
a total amount of $SiO_2$ and $P_2O_5$ that is greater than 65 mol % and less than 67 mol % (65 mol % <$SiO_2$(mol %)+$P_2O_5$ (mol %)<67 mol %); and
a relationship $R_2O$ (mol %)+R'O(mol %) −($Al_2O_3$(mol %)+$P_2O_5$ (mol %)) that is greater than about −3 mol %, wherein $R_2O$=the total amount of $Li_2O$ and $Na_2O$ present in the alkali aluminosilicate glass article and R'O is a total amount of divalent metal oxides present in the alkali aluminosilicate glass article.

32. The alkali aluminosilicate glass article of claim 29, further comprising a compressive stress layer extending from a surface of the alkali aluminosilicate glass article to a depth of layer (DOL), wherein the DOL is greater than or equal to 40 μm.

* * * * *

UNITED STATES PATENT AND TRADEMARK OFFICE
CERTIFICATE OF CORRECTION

PATENT NO. : 11,104,602 B2
APPLICATION NO. : 15/191961
DATED : August 31, 2021
INVENTOR(S) : Timothy Michael Gross Page 1 of 2

It is certified that error appears in the above-identified patent and that said Letters Patent is hereby corrected as shown below:

On the Title Page

In Column 2, item (74), Attorney, Agent, or Firm, Line 1, delete "Leffrey" and insert -- Jeffrey --, therefor.

On page 2, in Column 2, item (56), Other Publications, Line 1, delete "SiAIPON" and insert -- SiAlPON --, therefor.

In the Claims

In Column 40, Line 67, Claim 1, delete "Li$_2$O/Na$_2$O)" and insert -- (Li$_2$O/Na$_2$O) --, therefor.

In Column 41, Line 16 (approx.), Claim 4, delete "Li$^2$O+Na$_2$O." and insert -- Li$_2$O+Na$_2$O. --, therefor.

In Column 41, Line 25, Claim 6, delete "Al$_2$O$_3$" and insert -- (Al$_2$O$_3$ --, therefor.

In Column 42, Line 29, Claim 19, delete "glass of" and insert -- glass article of --, therefor.

In Column 42, Line 32, Claim 20, delete "glass of" and insert -- glass article of --, therefor.

In Column 42, Line 36, Claim 21, delete "glass claim" and insert -- glass article of claim --, therefor.

In Column 42, Line 41, Claim 22, delete "glass of" and insert -- glass article of --, therefor.

In Column 42, Line 43, Claim 22, delete "Al$_2$O$_3$" and insert -- (Al$_2$O$_3$ --, therefor.

In Column 42, Line 49, Claim 23, delete "glass of" and insert -- glass article of --, therefor.

In Column 43, Line 2, Claim 25, delete "aluminosilicate article" and insert -- aluminosilicate glass article --, therefor.

Signed and Sealed this
Nineteenth Day of April, 2022

Katherine Kelly Vidal
*Director of the United States Patent and Trademark Office*

CERTIFICATE OF CORRECTION (continued)
U.S. Pat. No. 11,104,602 B2

In Column 43, Line 9, Claim 25, delete "$Li_2O/Na_2O$)" and insert -- ($Li_2O/Na_2O$) --, therefor.

In Column 43, Line 23, Claim 29, after "article comprising"" delete "at".

In Column 44, Line 1, Claim 29, delete "$Li_2O/Na_2O$)" and insert -- ($Li_2O/Na_2O$) --, therefor.